US012794382B2

(12) United States Patent
Yoshioka et al.

(10) Patent No.: US 12,794,382 B2
(45) Date of Patent: Nov. 10, 2026

(54) ELECTROSTATIC CHUCK MEMBER, ELECTROSTATIC CHUCK DEVICE, AND METHOD FOR MANUFACTURING ELECTROSTATIC CHUCK MEMBER

(71) Applicant: SUMITOMO OSAKA CEMENT CO., LTD., Tokyo (JP)

(72) Inventors: Yoshiki Yoshioka, Tokyo (JP); Hironori Kugimoto, Tokyo (JP); Kentaro Takahashi, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 160 days.

(21) Appl. No.: 18/839,434

(22) PCT Filed: Mar. 15, 2023

(86) PCT No.: PCT/JP2023/010079

§ 371 (c)(1),
(2) Date: Aug. 18, 2024

(87) PCT Pub. No.: WO2023/176886

PCT Pub. Date: Sep. 21, 2023

(65) Prior Publication Data

US 2025/0158543 A1 May 15, 2025

(30) Foreign Application Priority Data

Mar. 18, 2022 (JP) ................................ 2022-044583

(51) Int. Cl.

| | |
|---|---|
| ***H02N 13/00*** | (2006.01) |
| ***B22F 5/00*** | (2006.01) |
| ***B22F 7/06*** | (2006.01) |

(52) U.S. Cl.

CPC ............ *H02N 13/00* (2013.01); *B22F 7/064* (2013.01); *B22F 2005/002* (2013.01)

(58) Field of Classification Search

CPC ... H02N 13/00; B22F 7/064; B22F 2005/002; H10P 72/7624; H10P 72/70;

(Continued)

(56) References Cited

U.S. PATENT DOCUMENTS

| | | | | |
|---|---|---|---|---|
| 2004/0011287 | A1 | 1/2004 | Ootsuka | |
| 2017/0110357 | A1* | 4/2017 | Ishikawa ............ | H10P 72/0432 |

(Continued)

FOREIGN PATENT DOCUMENTS

| | | |
|---|---|---|
| JP | 2004055608 | 2/2004 |
| JP | 2010114416 | 5/2010 |

(Continued)

OTHER PUBLICATIONS

"International Search Report (Form PCT/ISA/210) of PCT/JP2023/010079", mailed on May 30, 2023, with English translation thereof, pp. 1-4.

*Primary Examiner* — Sreeya Sreevatsa
(74) *Attorney, Agent, or Firm* — JCIPRNET

(57) ABSTRACT

An electrostatic chuck member provided with a placement surface and a lower surface includes a first plate body, a second plate body, and a third plate body stacked in this order in a thickness direction and bonded to each other, a first electrode layer located between the first plate body and the second plate body, a power feeding portion bonding layer located between the second plate body and the third plate body, a first power feeding portion, and a second power feeding portion, in which the first power feeding portion connects the first electrode layer and the power feeding portion bonding layer, the second power feeding portion extends from the power feeding portion bonding layer to a lower surface side, and the first electrode layer and the second power feeding portion are electrically connected (Continued)

with the first power feeding portion and the power feeding portion bonding layer interposed therebetween.

11 Claims, 4 Drawing Sheets

(58) Field of Classification Search
CPC .... H10P 72/7616; H10P 72/72; H10P 72/722; C22C 32/00; C22C 29/00
USPC .......................................................... 361/234
See application file for complete search history.

(56) References Cited

U.S. PATENT DOCUMENTS

| | | | | |
|---|---|---|---|---|
| 2017/0323819 | A1* | 11/2017 | Kosakai | H10P 72/0432 |
| 2022/0388914 | A1* | 12/2022 | Miura | C04B 35/111 |

FOREIGN PATENT DOCUMENTS

| | | | |
|---|---|---|---|
| JP | 2021125698 | 8/2021 | |
| WO | 2016080262 | 5/2016 | |
| WO | WO-2019163757 A1 * | 8/2019 | H10P 72/7616 |

* cited by examiner

ELECTROSTATIC CHUCK MEMBER, ELECTROSTATIC CHUCK DEVICE, AND METHOD FOR MANUFACTURING ELECTROSTATIC CHUCK MEMBER

CROSS-REFERENCE TO RELATED APPLICATION

This application is a 371 application of the International PCT application serial no. PCT/JP2023/010079, filed on Mar. 15, 2023, which claims the priority benefit of Japan Patent Application No. 2022-044583, filed on Mar. 18, 2022. The entirety of each of the above-mentioned patent applications is hereby incorporated by reference herein and made a part of this specification.

TECHNICAL FIELD

The present invention relates to an electrostatic chuck member, an electrostatic chuck device, and a method for manufacturing an electrostatic chuck member.

This application claims priority based on Japanese Patent Application No. 2022-044583 filed in Japan on Mar. 18, 2022, the content of which is incorporated herein by reference.

BACKGROUND ART

In a semiconductor manufacturing process, an electrostatic chuck device that holds a semiconductor wafer in a vacuum environment is used. In the electrostatic chuck device, a plate-shaped sample such as a semiconductor wafer is placed on a placement surface, and an electrostatic force is generated between the plate-shaped sample and an electrode layer to adsorb and fix the plate-shaped sample. In recent years, with high functionality of the electrostatic chuck device, an electrostatic chuck member in which various electrode layers other than those for electrostatic adsorption are embedded has been developed. Patent Literature No. 1 discloses a susceptor with built-in electrode including four plate bodies and three electrode layers disposed between the plate bodies. In Patent Literature No. 1, a power supply terminal extending through the plate body is connected to each electrode.

CITATION LIST

Patent Literature

[Patent Literature No. 1] Japanese Laid-open Patent Publication No. 2004-55608

SUMMARY OF INVENTION

Technical Problem

In the related art structure, a power feeding portion connected to the electrode layer extends across a plurality of plate bodies. In the case where the power feeding portion and the electrode layer are integrally bonded by a method involving pressurization such as hot pressing in the related art structure, a large pressure is applied to the plate body at a portion where the power feeding portion overlaps, and thus insulating properties of the plate body may deteriorate. As a result, reliability of the electrostatic chuck member may be impaired.

An object of the present invention is to provide a highly reliable electrostatic chuck member, an electrostatic chuck device, and a method for manufacturing an electrostatic chuck member.

Solution to Problem

A first aspect of the present invention relates to the following electrostatic chuck member.

The electrostatic chuck member according to the first aspect of the present invention has a placement surface on which a sample is placed and a lower surface located on an opposite side of the placement surface, the electrostatic chuck member including a first plate body, a second plate body, and a third plate body that are stacked in this order in a thickness direction and bonded to each other, a first electrode layer located between the first plate body and the second plate body, a power feeding portion bonding layer located between the second plate body and the third plate body, a first power feeding portion embedded in the second plate body and having a columnar shape, and a second power feeding portion embedded in the third plate body and having a columnar shape, in which the first power feeding portion connects the first electrode layer and the power feeding portion bonding layer, the second power feeding portion extends from the power feeding portion bonding layer to a lower surface side, and the first electrode layer and the second power feeding portion are electrically connected with the first power feeding portion and the power feeding portion bonding layer interposed therebetween.

The first aspect includes the following features. It is also preferable to combine two or more of these features.

In the electrostatic chuck member described above, a configuration may be adopted in which the second power feeding portion and the first power feeding portion are disposed to face each other with the power feeding portion bonding layer interposed therebetween.

In the electrostatic chuck member described above, a configuration may be adopted in which the electrostatic chuck member further includes a second electrode layer located between the second plate body and the third plate body, and a third power feeding portion embedded in the third plate body, extending from the second electrode layer to the lower surface side, and having a columnar shape.

In the electrostatic chuck member described above, a configuration may be adopted in which the electrostatic chuck member further includes at least one of a first insulating bonding layer disposed between the first plate body and the second plate body at a position different from a position of the first electrode layer and a second insulating bonding layer disposed between the second plate body and the third plate body at a position different from positions of the second electrode layer and the power feeding portion bonding layer, and the first insulating bonding layer and the second insulating bonding layer are made of different materials from the first plate body, the second plate body, and the third plate body.

In the electrostatic chuck member described above, an outer peripheral surface of the first power feeding portion and the second plate body may be densely bonded at a boundary therebetween, and an outer peripheral surface of the second power feeding portion and the third plate body may be densely bonded at a boundary therebetween.

In the electrostatic chuck member described above, the first plate body, the second plate body, the third plate body, the first power feeding portion, the second power feeding portion, and the first electrode layer, and the power feeding portion bonding layer may be a composite sintered body of an insulating material and a conductive material.

The first plate body, the second plate body, and the third plate body may be a plate body obtained by forming and sintering a mixed powder of aluminum oxide powder and silicon carbide powder.

In the electrostatic chuck member described above, the first power feeding portion and the second power feeding portion may be a columnar member obtained by forming and sintering a mixed powder of aluminum oxide powder and molybdenum carbide powder.

In the electrostatic chuck member described above, the power feeding portion bonding layer may be a layer obtained by disposing and drying a power feeding portion bonding layer paste on one surface of the first power feeding portion embedded in the second plate body and one surface of the second power feeding portion embedded in the third plate body, and overlapping and hot pressing the first power feeding portion and the second power feeding portion such that the dried power feeding portion bonding layer paste is located inside.

A second aspect of the present invention relates to an electrostatic chuck device including the electrostatic chuck member described above, and a base member that supports the electrostatic chuck member from the opposite side of the placement surface.

A third aspect of the present invention relates to the following method for manufacturing an electrostatic chuck member. That is, the method for manufacturing an electrostatic chuck member includes a plate body sintering step of obtaining a first plate body, a second plate body, and a third plate body by sintering, a power feeding portion sintering step of obtaining a first power feeding portion, a second power feeding portion, and a third power feeding portion by sintering, and a bonding and sintering step, in which the bonding and sintering step is a step of bonding and integrating the first plate body, the second plate body, the third plate body, a first electrode layer disposed between the first plate body and the second plate body, the first power feeding portion inserted into a first through-hole of the second plate body, the second power feeding portion inserted into a second through-hole of the third plate body, and a power feeding portion bonding layer disposed between the first power feeding portion and the second power feeding portion.

In the method for manufacturing an electrostatic chuck member, in the bonding and sintering step, the third power feeding portion inserted into a third through-hole of the third plate body and a second electrode layer disposed between the second plate body and the third plate body may also be integrated together.

The method for manufacturing an electrostatic chuck member described above may further include, before the bonding and sintering step, a step of preparing a conductive layer paste for forming the first electrode layer, a conductive layer paste for forming the second electrode layer, and a conductive layer paste for forming the power feeding portion bonding layer.

The method for manufacturing an electrostatic chuck member described above may further include, before the bonding and sintering step, a step of applying the conductive layer paste for forming the first electrode layer onto at least one of the first plate body and the second plate body, and a step of applying the conductive layer paste for forming the second electrode layer and the conductive layer paste for forming the power feeding portion bonding layer onto at least one of the second plate body and the third plate body.

The method for manufacturing an electrostatic chuck member described above may further include, before the bonding and sintering step, a step of inserting the first power feeding portion into the first through-hole of the second plate body, inserting the second power feeding portion into the second through-hole of the third plate body, and inserting the third power feeding portion into the third through-hole of the third plate body, and a step of disposing the first electrode layer between the first plate body and the second plate body and disposing the second electrode layer and the power feeding portion bonding layer between the second plate body and the third plate body.

Advantageous Effects of Invention

According to one aspect of the present invention, a highly reliable electrostatic chuck member, an electrostatic chuck device, and a method for manufacturing an electrostatic chuck member are provided.

DESCRIPTION OF EMBODIMENTS

Hereinafter, an example of each embodiment of an electrostatic chuck device according to the present invention will be described below with reference to the drawings. In all of the following drawings, in order to make the drawings easy to read, dimensional ratios of respective components may be displayed differently as appropriate.

In addition, the following description is made for better understanding of the scope of the invention, and does not limit the present invention unless otherwise specified. Within a range not departing from the present invention, changes, omissions, or additions can be made for a number, an amount, a position, a size, a numerical value, a ratio, an order, a kind, a shape, or the like.

In addition, a Z axis is shown in each drawing. In the present specification, the Z axis is a direction orthogonal to a placement surface. In addition, a direction in which a placement surface 10*s* faces is defined as a +Z direction and an upper side. In the present specification, each part is described with an up-down direction defined based on a posture in which the placement surface 10*s* faces upward, but a posture of an electrostatic chuck device 1 in use is not limited to this direction.

<Electrostatic Chuck Device>

Figure 1:
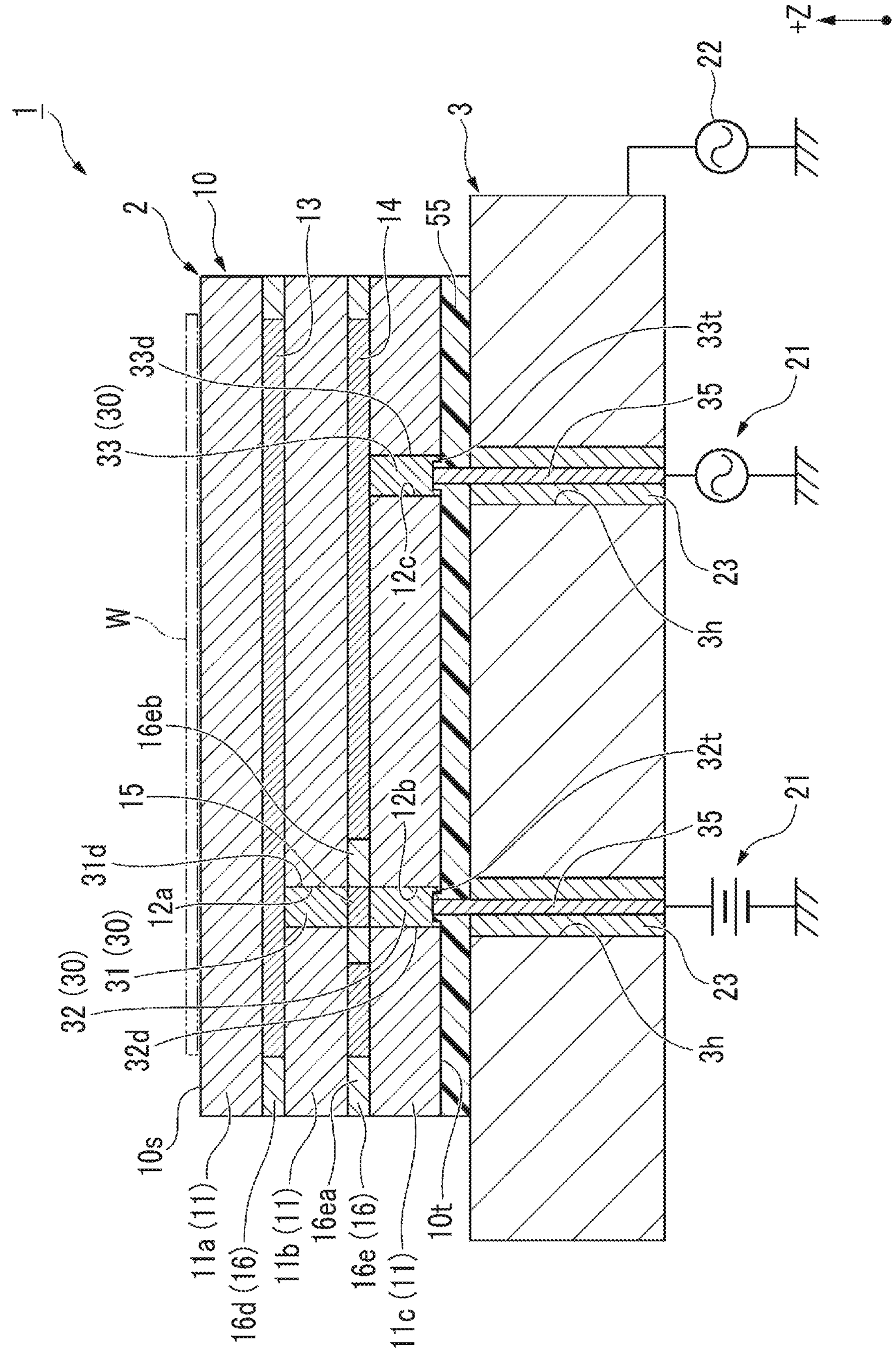
FIG. 1 is a schematic cross-sectional view showing a preferred example of an electrostatic chuck device according to an embodiment.

FIG. 1 is a schematic cross-sectional view showing a preferred example of the electrostatic chuck device 1 according to the present embodiment.

The electrostatic chuck device 1 includes an electrostatic chuck member 2 provided with a placement surface 10*s* on which a wafer (sample) W is placed, a base member 3 that supports the electrostatic chuck member 2 from an opposite side of the placement surface 10*s*, and a terminal member 35 that applies a voltage to the electrostatic chuck member 2. A focus ring surrounding the wafer W may be disposed on an outer peripheral portion of an upper surface of the electrostatic chuck member 2.

<Electrostatic Chuck Member>

The electrostatic chuck member 2 has a disk shape in plan view. The electrostatic chuck member 2 adsorbs the wafer W on the placement surface 10*s* provided on a base body 10.

In the following description, the up-down direction (Z axis direction) may be referred to as a thickness direction of the electrostatic chuck member 2 and the base body 10. That is, the electrostatic chuck member 2 and the base body 10 have a direction orthogonal to the placement surface 10*s* as a thickness direction.

(Base Body)

The base body 10 has a circular plate shape in plan view. The base body 10 is provided with the placement surface 10*s* on which the wafer W is placed, and a lower surface 10*t* located on the opposite side of the placement surface 10*s*. On the placement surface 10*s*, for example, a plurality of protrusions (not shown) may be formed at predetermined intervals. The placement surface 10*s* preferably supports the wafer W at tips of the plurality of protrusions.

The base body 10 is formed of a plate body 11 (first plate body (plate body) 11*a*, second plate body (plate body) 11*b*, and third plate body (plate body) 11*c*), a first electrode layer (conductive layer) 13, a second electrode layer (conductive layer) 14, a power feeding portion bonding layer (conductive layer) 15, a power feeding portion 30 (first power feeding portion (power feeding portion) 31, second power feeding portion (power feeding portion) 32, and third power feeding portion (power feeding portion) 33), and an insulating bonding layer 16 (first insulating bonding layer (insulating layer) 16*d* and second insulating bonding layer (insulating layer) 16*e*).

The first plate body 11*a*, the second plate body 11*b*, and the third plate body 11*c* are plate-shaped bodies extending along the placement surface 10*s*. The first plate body 11*a*, the second plate body 11*b*, and the third plate body 11*c* are stacked in this order in the thickness direction from the upper side toward the lower side.

The first insulating bonding layer 16*d* and the first electrode layer 13 are disposed between the first plate body 11*a* and the second plate body 11*b*. The first insulating bonding layer 16*d* is disposed in an outer peripheral portion of the first electrode layer 13.

The first plate body 11*a* and the second plate body 11*b* are bonded with the first insulating bonding layer 16*d* and the first electrode layer 13 interposed therebetween.

The second insulating bonding layer 16*e*, the second electrode layer 14, and the power feeding portion bonding layer 15 are disposed between the second plate body 11*b* and the third plate body 11*c*. In plan view, the power feeding portion bonding layer 15 is disposed inside the second electrode layer 14 and is not exposed on a side surface. The second insulating bonding layer 16*e* is disposed in an outer peripheral portion of the second electrode layer 14 and between the power feeding portion bonding layer 15 and the second electrode layer 14. The power feeding portion bonding layer 15 is surrounded by the second insulating bonding layer 16*e*. That is, the second insulating bonding layer 16*e* is disposed between the second plate body 11*b* and the third plate body 11*c* at a position different from the second electrode layer 14 and the power feeding portion bonding layer 15. The second plate body 11*b* and the third plate body 11*c* are bonded with the second insulating bonding layer 16*e*, the second electrode layer 14, and the power feeding portion bonding layer 15 interposed therebetween.

The first power feeding portion 31 is installed in a first through-hole 12*a* provided in the second plate body 11*b*, and is bonded to the second plate body 11*b*, the first electrode layer 13, and the power feeding portion bonding layer 15. The second power feeding portion 32 is installed in a second through-hole 12*b* provided in the third plate body 11*c*, and is bonded to the third plate body 11*c* and the power feeding portion bonding layer 15. The third power feeding portion 33 is installed in a third through-hole 12*c* provided in the third plate body 11*c*, and is bonded to the third plate body 11*c* and the second electrode layer 14.

The base body 10 is a ceramic bonded body in which the first plate body 11*a*, the second plate body 11*b*, and the third plate body 11*c* are bonded to each other. The first plate body 11*a*, the second plate body 11*b*, and the third plate body 11*c*, which are sintered in advance, are bonded to each other and used as the base body 10, whereby the base body 10 can be formed with less influence of shrinkage or deformation in the sintering process of the plate body 11, and a base body 10 having good dimensional accuracy and withstand voltage can be obtained. In particular, since the base body 10 is formed through bonding without deformation due to sintering, a boundary between the plate body 11 and the electrode layers 13 and 14 and (or) a boundary between the plate body 11 and the power feeding portion 30 are (is) formed flat, so that it is possible to prevent discharge and dielectric breakdown caused by electric field concentration when used as an electrostatic chuck. The base body 10 does not need to have the first insulating bonding layer 16*d* and the second insulating bonding layer 16*e*. In this case, the first plate body 11*a* and the second plate body 11*b* are directly bonded without the insulating bonding layer.

(Plate Body)

The first plate body 11*a*, the second plate body 11*b*, and the third plate body 11*c* are made of a ceramic sintered body having sufficient mechanical strength and durability against corrosive gas and its plasma. As a material constituting the plate body 11, ceramics having mechanical strength and durability against corrosive gas and its plasma are suitably used.

Thicknesses of the first plate body 11*a*, the second plate body 11*b*, and the third plate body 11*c* can be appropriately selected depending on the purpose of using the electrostatic chuck, the conditions of use, and the like. In general, the thickness of the first plate body 11*a* is preferably 0.3 mm or more and 0.8 mm or less. The thickness of the second plate body 11*b* is preferably 1 mm or more and 10 mm or less, and more preferably 2 mm or more and 8 mm or less. The thickness of the third plate body 11*c* is preferably 1 mm or more and 10 mm or less, and more preferably 2 mm or more and 8 mm or less. The thickness may be 1.0 mm or more and 9.0 mm or less, 3.0 mm or more and 7.0 mm or less, 4.0 mm or more and 6.0 mm or less, or the like.

As the ceramics constituting the first plate body 11*a*, the second plate body 11*b*, and the third plate body 11*c*, for example, an aluminum oxide ($Al_2O_3$) sintered body, an aluminum nitride (AlN) sintered body, an aluminum oxide ($Al_2O_3$)-silicon carbide (SiC) composite sintered body, a sapphire substrate ($Al_2O_3$ single crystal), or the like is suitably used, and the content of metal impurities other than aluminum (Al) and silicon (Si) and sintering aids is preferably 0.1% or less in order to prevent contamination of a semiconductor manufacturing apparatus. The plate bodies may be made of the same material.

In particular, from the viewpoint of dielectric properties, high corrosion resistance, plasma resistance, and heat resistance at a high temperature, main components of the first plate body 11*a*, the second plate body 11*b*, and the third plate body 11*c* are preferably aluminum oxide ($Al_2O_3$). The term "main component" may mean a material having the highest compounding ratio. For example, the amount of the aluminum oxide in the plate body may be more than 50% by volume, 60% by volume or more, 70% by volume or more, 80% by volume or more, 90% by volume or more, or 95% by volume or more.

The term "ceramics" in the present invention means a solid made of an inorganic material, and a single crystal or an amorphous body is also included in the ceramics. In the present invention, even in a case where a substrate made of a single crystal or an amorphous body is used as the ceramics constituting the first plate body 11*a*, the second plate body 11*b*, and the third plate body 11*c*, it is possible to obtain the effect of preventing the shrinkage and deformation when forming the base body 10, as in a case of using a sintered body, which has been sintered in advance, as the first plate body 11*a*, the second plate body 11*b*, and the third plate body 11*c*. That is, even in a case where the plate body 11 made of a single crystal or an amorphous body is used, the plate body 11 does not greatly shrink and deform when the plate body 11 is bonded to other parts (insulating bonding layers 16, electrode layers 13 and 14, and power feeding portion 30). Therefore, a boundary between the plate body 11 and other parts can be formed flat, and the discharge and the dielectric breakdown caused by the electric field concentration can be prevented.

By using aluminum oxide as the main components of the first plate body 11*a*, the second plate body 11*b*, and the third plate body 11*c*, a bonding temperature between the plate bodies 11 can be increased. Further, in a case where the first plate body 11*a*, the second plate body 11*b*, and the third plate body 11*c* are made of a composite sintered body of aluminum oxide and silicon carbide, a particle size of the plate body 11 can be prevented from being excessively increased even in a case where the bonding temperature between the plate bodies 11 is increased, so that both the withstand voltage properties and the plasma resistance of the plate body 11 can be achieved, the dielectric constant of the first plate body 11*a* can be increased, and the adsorption force when used as an electrostatic chuck can be increased.

An average primary particle diameter of an insulating material (for example, aluminum oxide) that is the main component of the first plate body 11*a*, the second plate body 11*b*, and the third plate body 11*c* is preferably 10 μm or less, more preferably 6 μm or less, and still more preferably 4.0 μm or less. The particle diameter may be 3.0 μm or less or 2.0 μm or less. By setting the average primary particle diameter of the insulating material constituting the base body 10 to 10 μm or less, the plasma resistance of the plate body 11 can be improved, and the mechanical strength is sufficiently high, so that chipping is difficult to occur.

In a case where the plate body 11 is manufactured from a material by sintering at normal pressure, when the base body 10 in which a density of the plate body 11 is 98% or more and the electrode layers 13 and 14 are bonded is produced, the average primary particle diameter of the main component in the plate body 11 exceeds 10 μm. In order to set the average primary particle diameter of the base body 10 to 10 μm or less, the plate body 11 needs to be sintered while being pressurized by hot pressing, a hot isostatic pressing apparatus (HIP), or the like.

In addition, from the viewpoint of the withstand voltage, the average primary particle diameter of the main component in the first plate body 11*a*, the second plate body 11*b*, and the third plate body 11*c* is preferably 0.5 μm or more. That is, the average primary particle diameter of the main component of the plate body 11 is preferably 0.5 μm or more and 10 μm or less (more preferably 4.0 μm or less).

A method for measuring the average primary particle diameter of the main component in the first plate body 11*a*, the second plate body 11*b*, and the third plate body 11*c* is as follows. A cut surface of the base body 10 in the thickness direction is observed using a field emission scanning electron microscope (FE-SEM) manufactured by JEOL Ltd. On the observed cut surface, 200 particles of the insulating material, which is the main component of the base body 10, are selected by an intercept method and particle diameters thereof are measured, and an average of the particle diameters is defined as the average primary particle diameter. The cut surface of the sample is formed by mirror-polishing and thermal etching a surface obtained by cutting the sample in the thickness direction using a rotating disk-shaped grindstone. In addition, in each evaluation, the cutting method of the sample is the same.

The first plate body 11*a*, the second plate body 11*b*, and the third plate body 11*c* preferably have a relative density of 98% or more. By setting the relative density of each layer to 98% or more, the plasma resistance and the withstand voltage properties can be sufficiently increased. The relative density may be obtained by measuring an apparent density using an Archimedes method and obtaining a ratio of the apparent density to a theoretical density, or may be obtained by observing a mirror-finished cross section with a scanning electron microscope, an optical microscope, or the like and measuring a porosity.

In a case where the sintering is performed while applying pressure, the relative density of the respective plate bodies 11 and the insulating bonding layer 16 can be set to be 98% or more even when a material whose relative density cannot be 98% or more is used in sintering at normal pressure, such as when a sintering-resistant material or a composite sintered body of aluminum oxide and silicon carbide is used as the first plate body 11*a*, the second plate body 11*b*, and the third plate body 11*c*.

Withstand voltages of the first plate body 11*a*, the second plate body 11*b*, and the third plate body 11*c* are preferably 8 kV/mm or higher, more preferably 12 kV/mm or higher, and most preferably 15 kV/mm or higher. It is preferable that main components of materials constituting the first plate body 11*a*, the second plate body 11*b*, the third plate body 11*c*, the first insulating bonding layer 16*d*, and the second insulating bonding layer 16*e* are the same. As long as the main components are the same, even in a case where the types and composition ratios of other materials are different, the above-described effect of increasing the withstand voltage can be obtained.

(Insulating Bonding Layer)

The first insulating bonding layer 16*d* and the second insulating bonding layer 16*e* are made of a sintered body having sufficient mechanical strength and durability against corrosive gas and its plasma.

Thicknesses of the first insulating bonding layer 16*d* and the second insulating bonding layer 16*e* can be optionally selected, and are preferably 200 μm or less and more preferably 120 μm or less. By setting the thicknesses of the first insulating bonding layer 16*d* and the second insulating bonding layer 16*e* to 200 μm or less, it is possible to prevent a decrease in withstand voltage when an outer peripheral surface of the base body 10 is exposed to plasma. A lower limit value of the thickness of the insulating bonding layer may be optionally selected, and may be, for example, 3 μm or higher.

Withstand voltages of the first insulating bonding layer 16*d* and the second insulating bonding layer 16*e* are preferably 8 kV/mm or higher, more preferably 12 kV/mm or higher, and most preferably 15 kV/mm or higher. Widths of the first insulating bonding layer 16*d* and the second insulating bonding layer 16*e* are preferably as narrower as possible within a range in which the withstand voltage when used as an electrostatic chuck can be ensured, and a value of 0.5 mm or more and 2 mm or less is suitably used as the width. In a case where the first plate body 11*a*, the second plate body 11*b*, and the third plate body 11*c*, which are sintered in advance, are bonded to each other and used as the base body 10, the amount of shrinkage in bonding is reduced.

Therefore, a variation in widths of the first insulating bonding layer 16*d* and the second insulating bonding layer 16*e* can be reduced, and the electrostatic chuck can be made highly reliable even in a case where the widths of the first insulating bonding layer 16*d* and the second insulating bonding layer 16*e* are 1 mm or less.

As a dielectric material constituting the first insulating bonding layer 16*d* and the second insulating bonding layer 16*e*, ceramics having mechanical strength and durability against corrosive gas and its plasma are suitably used. As the ceramics constituting the first insulating bonding layer 16*d* and the second insulating bonding layer 16*e*, for example, an aluminum oxide ($Al_2O_3$) sintered body, an aluminum nitride (AlN) sintered body, an aluminum oxide ($Al_2O_3$)-silicon carbide (SiC) composite sintered body, or the like is suitably used.

Further, it is preferable to use materials capable of performing bonding between the plate bodies 11 well as the materials constituting the first insulating bonding layer 16*d* and the second insulating bonding layer 16*e*. In order to perform the bonding well, it is preferable to use a material having the same main component as the first plate body 11*a*, the second plate body 11*b*, and the third plate body 11*c*, and having a different composition and particle diameter from the first plate body 11*a*, the second plate body 11*b*, and the third plate body 11*c*, and it is preferable to use a material having high sinterability as described below.

In the present embodiment, the insulating bonding layer 16 (first insulating bonding layer 16*d* and second insulating bonding layer 16*e*) is made of a different material from the plate body 11 (first plate body 11*a*, second plate body 11*b*, and third plate body 11*c*). With this configuration, the plate body 11 and the insulating bonding layer 16 can be bonded well. In particular, it is most preferable that the main components of the plate body 11 and the insulating bonding layer 16 are the same kind of materials and the particle diameters thereof are different from each other. For example, it is preferable that the plate body and the insulating bonding layer have different particle diameters in the layers and contain the same main component, and it is more preferable that the plate body and the insulating bonding layer are made of the same kind of ceramics. In these cases, the plate body 11 and the insulating bonding layer 16 can be bonded even better.

Here, the term "different material" means a concept including not only a case where the constituent materials have different compositions but also a case where the constituent materials have different particle diameters even in a case where the constituent materials have the same compositions.

Examples of the material having high sinterability that is preferably used for the insulating bonding layer include a material composed of only the material used as the main component of the first plate body 11*a*, the second plate body 11*b*, and the third plate body 11*c*, and a material obtained by adding a sintering aid to the material used as the main component of the first plate body 11*a*, the second plate body 11*b*, and the third plate body 11*c*. For example, in a case where a composite sintered body of aluminum oxide and silicon carbide is used as the first plate body 11*a*, the second plate body 11*b*, and the third plate body 11*c*, it is preferable that the materials constituting the first insulating bonding layer 16*d* and the second insulating bonding layer 16*e* are an aluminum oxide sintered body. By using the aluminum oxide sintered body as the materials constituting the first insulating bonding layer 16*d* and the second insulating bonding layer 16*e*, the bonding can be performed well, and the withstand voltage properties and the plasma resistance of the first plate body 11*a*, the second plate body 11*b*, and the third plate body 11*c*, and the withstand voltage properties of the first insulating bonding layer 16*d* and the second insulating bonding layer 16*e* can be achieved.

In addition, from the viewpoint of the withstand voltage, an average primary particle diameter of the main component in the first insulating bonding layer 16*d* and the second insulating bonding layer 16*e* is preferably 0.01 μm or more, more preferably 0.1 μm or more, and still more preferably 0.5 μm or more. An upper limit of the average primary particle diameter can be optionally selected, and may be, for example, 10 μm or less, 5 μm or less, or 2 μm or less. The average primary particle diameter of the main component in the first insulating bonding layer 16*d* and the second insulating bonding layer 16*e* can be measured by the same method as the average primary particle diameter of the main component of the plate body 11 described above.

The first insulating bonding layer 16*d* and the second insulating bonding layer 16*e* preferably have a relative density of 98% or more. By setting the relative density of each layer to 98% or more, the plasma resistance and the withstand voltage properties can be sufficiently increased. Densities of the first insulating bonding layer 16*d* and the second insulating bonding layer 16*e* can be measured by the same method as the average primary particle diameter of the main component of the plate body 11 described above.

(Electrode Layer and Power Feeding Portion Bonding Layer)

The first electrode layer 13, the second electrode layer 14, and the power feeding portion bonding layer 15 each extend in a layered manner along the placement surface 10*s*. The first electrode layer 13 is located between the first plate body 11*a* and the second plate body 11*b*, and surfaces of the first electrode layer 13, the first plate body 11*a*, and their surfaces in contact with each other are bonded to each other. Therefore, the first electrode layer 13 is disposed on the same plane as the first insulating bonding layer 16*d*. The first insulating bonding layer 16*d* is disposed in an annular shape along an outer edge of the base body 10. The first electrode layer 13 is disposed inside the first insulating bonding layer 16*d* as viewed in the thickness direction. In a case where the first plate body 11*a* and the second plate body 11*b* are bonded to each other without providing the first insulating bonding layer 16*d*, a recess is provided in the first plate body 11*a* or (and) the second plate body 11*b*, and the first electrode layer 13 is installed in the recess.

The second electrode layer 14 and the power feeding portion bonding layer 15 are located between the second plate body 11*b* and the third plate body 11*c*, and their surfaces in contact with each other are bonded to each other. The second electrode layer 14 and the power feeding portion bonding layer 15 are disposed on a lower side of the first electrode layer 13. In addition, the second electrode layer 14 and the power feeding portion bonding layer 15 are disposed on the same plane as the second insulating bonding layer 16*e*. The second insulating bonding layer 16*e* has an outer edge portion 16*ea* that is disposed in an annular shape along the outer edge of the base body 10, and a partitioning portion 16*eb* that is located inside the outer edge portion 16*ea* when viewed in the thickness direction and that partitions the second electrode layer 14 and the power feeding portion bonding layer 15. The second electrode layer 14 and the power feeding portion bonding layer 15 are disposed inside the outer edge portion 16*ea* of the second insulating bonding layer 16*e*. The power feeding portion bonding layer 15 has a circular shape in plan view. The power feeding portion bonding layer 15 is surrounded by the partitioning portion 16*eb* of the second insulating bonding layer 16*e* in plan view. In addition, the power feeding portion bonding layer 15 is surrounded by the second electrode layer 14 with the partitioning portion 16*eb* of the second insulating bonding layer 16*e* interposed therebetween.

In a case where the second plate body 11*b* and the third plate body 11*c* are bonded to each other without providing the second insulating bonding layer 16*e*, a recess is provided in the second plate body 11*b* or (and) the third plate body 11*c*, and the second electrode layer 14 and the power feeding portion bonding layer 15 are installed in the recess.

The first electrode layer 13 according to the present embodiment is an adsorption electrode that generates an electrostatic adsorption force for holding the wafer W on the placement surface 10*s* of the base body 10 in a case of being applied with a voltage. On the other hand, the second electrode layer 14 according to the present embodiment is a radio frequency (RF) electrode. In this case, the second electrode layer 14 generates plasma on the plate-shaped sample in a case of being applied with a voltage. Any one of the first electrode layer 13 or the second electrode layer 14 may function as a heater electrode that generates heat in a case where an electric current is passed therethrough. That is, the first electrode layer 13 and the second electrode layer 14 need only function as any of the electrostatic adsorption electrode, the heater electrode, or the RF electrode. In addition, the electrostatic chuck member may separately include an electrode layer that functions as any of the electrostatic adsorption electrode, the heater electrode, or the RF electrode, in addition to the first electrode layer 13 and the second electrode layer 14.

The power feeding portion bonding layer 15 does not exhibit a special function by application of a voltage. The power feeding portion bonding layer 15 according to the present embodiment is provided to relay the first power feeding portion 31 and the second power feeding portion 32, which will be described below.

Thicknesses of the first electrode layer 13, the second electrode layer 14, and the power feeding portion bonding layer 15 are preferably 3 μm or more and 200 μm or less, and more preferably 10 μm or more and 120 μm or less. For example, the thickness may be 3 μm or more and 20 μm or less, 20 μm or more and 60 μm or less, 60 μm or more and 150 μm or less, or the like, but is not limited to these examples. By setting the thicknesses of the first electrode layer 13, the second electrode layer 14, and the power feeding portion bonding layer 15 to 3 μm or more, the electrical resistance of the first electrode layer 13, the second electrode layer 14, and the power feeding portion bonding layer 15 can be sufficiently reduced. It is preferable that the second electrode layer 14 and the power feeding portion bonding layer 15 have the same thickness. In a case where the first insulating bonding layer 16*d* is provided, the first insulating bonding layer 16*d* and the first electrode layer 13 have the same thickness. In a case where the second insulating bonding layer 16*e* is provided, the second insulating bonding layer 16*e*, the second electrode layer 14, and the power feeding portion bonding layer 15 have the same thickness. In a case where they do not the same thickness, a stress is applied to the plate body 11 when bonding is performed, causing problems such as deformation of the plate body 11 and deterioration of the withstand voltage of the plate body 11.

It is preferable that the first electrode layer 13, the second electrode layer 14, and the power feeding portion bonding layer 15 are a composite sintered body of an insulating material and a conductive material. The insulating material contained in the first electrode layer 13, the second electrode layer 14, and the power feeding portion bonding layer 15 is preferably insulating ceramics, and for example, is preferably at least one selected from the group consisting of aluminum oxide ($Al_2O_3$), silicon oxide ($SiO_2$), aluminum nitride (AlN), silicon nitride ($Si_3N_4$), yttrium (III) oxide ($Y_2O_3$), yttrium aluminum garnet (YAG), and $SmAlO_3$.

Among these, the insulating material contained in the first electrode layer 13, the second electrode layer 14, and the power feeding portion bonding layer 15 is preferably the same material (for example, aluminum oxide) as the main component of the first plate body 11*a*, the second plate body 11*b*, and the third plate body 11*c*. That is, it is preferable that the first electrode layer 13, the second electrode layer 14, and the power feeding portion bonding layer 15 contain the same material as the main component of the first plate body 11*a*, the second plate body 11*b*, and the third plate body 11*c*. The first electrode layer 13, the second electrode layer 14, and the power feeding portion bonding layer 15 contain the same material as the main component of the plate body 11, so that, during sintering, the main components of the first plate body 11*a*, the second plate body 11*b*, and the third plate body 11*c* and the main components contained in the first electrode layer 13, the second electrode layer 14, and the power feeding portion bonding layer 15 can be sintered well at a boundary portion with the plate body 11. As a result, it is possible to increase the bonding strength between the first electrode layer 13, the second electrode layer 14, and the power feeding portion bonding layer 15, and the first plate body 11*a*, the second plate body 11*b*, and the third plate body 11*c*. In addition, since a difference in thermal expansion between the first electrode layer 13, the second electrode layer 14, and the power feeding portion bonding layer 15, and the first plate body 11*a*, the second plate body 11*b*, and the third plate body 11*c* can be reduced, damage caused by the difference in thermal expansion in a case where a temperature of the base body 10 rises can be reduced.

The conductive material contained in the first electrode layer 13, the second electrode layer 14, and the power feeding portion bonding layer 15 is preferably at least one selected from the group consisting of molybdenum carbide ($Mo_2C$), niobium carbide (NbC), molybdenum (Mo), tungsten carbide (WC), tungsten (W), tantalum carbide (TaC), tantalum (Ta), niobium (Nb), ruthenium (Ru), silicon carbide (SiC), carbon black, carbon nanotubes, and carbon nanofibers.

A ratio (compounding ratio) of the content of the insulating material to the content of the conductive material in the first electrode layer 13, the second electrode layer 14, and the power feeding portion bonding layer 15 is appropriately adjusted according to the application. The content of the conductive material in the ratio of the content of the insulating material to the content of the conductive material in the first electrode layer 13, the second electrode layer 14, and the power feeding portion bonding layer 15 is preferably 20% by volume or more and 80% by volume or less, more preferably 23% by volume or more and 60% by volume or less, and still more preferably 25% by volume or more and 50% by volume or less. The ratio may be 30% by volume or more and 45% by volume or less, 33% by volume or more and 40% by volume or less, or the like. By setting the content of the conductive material to 20% by volume or more, the first electrode layer 13, the second electrode layer 14, and the power feeding portion bonding layer 15 can have conductivity. In addition, by setting the content of the conductive material to 80% by volume or less, a difference in thermal expansion with the base body 10 is reduced, and the base body 10 and the power feeding portion 30 can be bonded well.

The compound material constituting the first electrode layer 13, the second electrode layer 14, and the power feeding portion bonding layer 15 may have different types of materials and different composition ratios.

The first electrode layer 13, the second electrode layer 14, and the power feeding portion bonding layer 15 preferably have a relative density of 96% or more, and more preferably have a relative density of 98% or more. By setting the relative density to the above value, the electrical resistance of the first electrode layer 13, the second electrode layer 14, and the power feeding portion bonding layer 15 can be reduced, and the bonding strength with the adjacent plate body 11 can be increased. In addition, by increasing the relative density, the content of the conductive material for imparting conductivity to the first electrode layer 13, the second electrode layer 14, and the power feeding portion bonding layer 15 is reduced, so that the content of the conductive material can be reduced, and the difference in thermal expansion with the base body 10 is reduced, and the base body 10 and the power feeding portion 30 can be bonded well.

In addition, it is preferable that the relative densities of the first electrode layer 13, the second electrode layer 14, and the power feeding portion bonding layer 15 are set to values smaller than the relative densities of the first insulating bonding layer 16*d* and the second insulating bonding layer 16*e*. By setting the relative densities of the first electrode layer 13, the second electrode layer 14, and the power feeding portion bonding layer 15 to values smaller than the relative densities of the first insulating bonding layer 16*d* and the second insulating bonding layer 16*e*, when bonding is performed by hot pressing, a stress applied to the first plate body 11*a* and the second plate body 11*b* in contact with the first electrode layer 13 and the second electrode layer 14 can be reduced, and a stress applied to the first insulating bonding layer 16*d* and the second insulating bonding layer 16*e* can be uniformly applied in a plane of the insulating bonding layer 16, so that the withstand voltage of the first plate body 11*a*, the second plate body 11*b*, the third plate body 11*c*, the first insulating bonding layer 16*d*, and the second insulating bonding layer 16*e* can be maintained in good condition.

The relative densities of the first electrode layer 13, the second electrode layer 14, and the power feeding portion bonding layer 15 can be obtained by observing a mirror-finished cross section of the first electrode layer 13, the second electrode layer 14, and the power feeding portion bonding layer 15 with a scanning electron microscope, an optical microscope, or the like and measuring a porosity.

In a case where the sintering is performed while applying pressure, the relative density of the base body 10 can be set to be 98% or more even when the relative density cannot be 98% or more in sintering at normal pressure, such as when a sintering-resistant material or a composite sintered body of aluminum oxide and a conductive material is used as the first electrode layer 13, the second electrode layer 14, and the power feeding portion bonding layer 15.

(Power Feeding Portion)

The first power feeding portion 31, the second power feeding portion 32, and the third power feeding portion 33 extend in a columnar shape along the thickness direction of the base body 10. The power feeding portions may be columnar members having a shape selected as necessary. It is preferable that the first power feeding portion 31, the second power feeding portion 32, and the third power feeding portion 33 according to the present embodiment have a cylindrical shape. By making the power feeding portion 30 cylindrical, an electric current distribution when the electric current flows through the power feeding portion 30 is constant in a vertical direction of the power feeding portion 30, so that heat generation in the power feeding portion 30 can be suppressed. In addition, by reducing irregularities on a side surface of the power feeding portion 30, the discharge caused by the electric field concentration can be prevented.

Outer diameters of the first power feeding portion 31, the second power feeding portion 32, and the third power feeding portion 33 are preferably 2 mm or more. By setting the outer diameters of the first power feeding portion 31, the second power feeding portion 32, and the third power feeding portion 33 to 2 mm or more, the electrical resistance can be suppressed, and power supply efficiency to the first electrode layer 13 and the second electrode layer 14 can be increased. In addition, by suppressing the electrical resistance, the heat generation of the first power feeding portion 31, the second power feeding portion 32, and the third power feeding portion 33 during energization can be suppressed, and the temperature uniformity of the electrostatic chuck member 2 can be improved. In addition, by setting the outer diameters of the first power feeding portion 31, the second power feeding portion 32, and the third power feeding portion 33 to 2 mm or more, even in a case where an AC voltage having a high frequency is supplied as a supply voltage, the increase in electrical resistance and the heat generation due to skin effect can be sufficiently suppressed, and the base body 10 can be used as the electrostatic chuck. In addition, for the same reason, the outer diameters of the first power feeding portion 31, the second power feeding portion 32, and the third power feeding portion 33 are more preferably 3 mm or more, and still more preferably 4 mm or more. For example, the outer diameters may be 5 mm or more, 8 mm or more, 10 mm or more, 15 mm or more, 20 mm or more, or 30 mm or more as necessary, but is not limited to these examples. An upper limit thereof is selected as necessary, and may be, for example, 50 mm or less, 40 mm or less, 30 mm or less, or 20 mm or less.

Lengths of the first power feeding portion 31, the second power feeding portion 32, and the third power feeding portion 33 are the same as thicknesses of the plate bodies 11 on which the first power feeding portion 31, the second power feeding portion 32, and the third power feeding portion 33 are respectively disposed, and in a case where the lengths are too long, damage may occur when bonding is performed by hot pressing, so that the lengths are preferably 10 mm or less and more preferably 6 mm or less.

In the present embodiment, the same electric current flows through the first power feeding portion 31 and the second power feeding portion 32. Therefore, it is preferable that the outer diameter of the first power feeding portion 31 and the outer diameter of the second power feeding portion 32 are equal to each other. In addition, since the supply target electrode layers 13 and 14 are different between the first power feeding portion 31 and the second power feeding portion 32, and the third power feeding portion 33, the electric currents flowing therein are also different from each other. The outer diameters of the first power feeding portion 31 and the second power feeding portion 32 may be the same as the outer diameter of the third power feeding portion 33 or different from the outer diameter of the third power feeding portion 33, and are appropriately set depending on the types of the electrode layers 13 and 14 to be connected.

Cross-sectional shapes of the first power feeding portion 31, the second power feeding portion 32, and the third power feeding portion 33 do not need to be circular in the strict sense. For example, the cross-sectional shapes of the first power feeding portion 31, the second power feeding portion 32, and the third power feeding portion 33 may be an elliptical shape or a polygonal shape. In this case, the outer diameter of the power feeding portion need only be 2 mm or more, preferably 3 mm or more, and more preferably 4 mm or more in terms of a circle-equivalent diameter (a diameter of a circle having an area equal to an area of the power feeding portion).

The first power feeding portion 31 is fitted into the second plate body 11*b*, and is bonded to the second plate body 11*b*, the first electrode layer 13, and the power feeding portion bonding layer 15. As a result, the first power feeding portion 31 connects the first electrode layer 13 and the power feeding portion bonding layer 15. The first power feeding portion 31 is disposed at a position overlapping the power feeding portion bonding layer 15 as viewed in the thickness direction of the base body 10.

A bonding surface of the power feeding portion bonding layer 15 need only overlap bonding surfaces of the first power feeding portion 31 and the second power feeding portion 32. An outer diameter of the power feeding portion bonding layer 15 may be the same as the outer diameters of the first power feeding portion 31 and the second power feeding portion 32, or may be larger than the outer diameters of the first power feeding portion 31 and the second power feeding portion 32. In a case where the outer diameter of the power feeding portion bonding layer 15 is made larger than the outer diameters of the first power feeding portion 31 and the second power feeding portion 32, the outer diameter of the power feeding portion bonding layer 15 is preferably larger than the outer diameters of the first power feeding portion 31 and the second power feeding portion 32, preferably by 0 mm or more and 5 mm or less, more preferably by 0.2 mm or more and 4 mm or less, and still more preferably by 0.5 mm or more and 3 mm or less. By increasing the outer diameter of the power feeding portion bonding layer 15, reliability of the bonding between the first power feeding portion 31 and the second power feeding portion 32 is improved.

The second power feeding portion 32 is fitted into the third plate body 11*c*, and is bonded to the third plate body 11*c* and the power feeding portion bonding layer 15. The second power feeding portion 32 extends from the power feeding portion bonding layer 15 to the lower surface 10*t* side of the base body 10. It is preferable that the second power feeding portion 32 is disposed at a position overlapping the power feeding portion bonding layer 15 and the first power feeding portion 31 as viewed in the thickness direction of the base body 10. The second power feeding portion 32 is disposed to face the first power feeding portion 31 with the power feeding portion bonding layer 15 interposed therebetween. By disposing the second power feeding portion 32 at a position overlapping the power feeding portion bonding layer 15 and the first power feeding portion 31 as viewed in the thickness direction of the base body 10, a loss when applying a voltage to the first electrode layer 13 can be reduced. As a result, it is possible to prevent deterioration of the temperature uniformity due to the first power feeding portion 31 and the second power feeding portion 32 in a case where the base body 10 is used as an electrostatic chuck.

In a case where a location where the first electrode layer 13 is installed and a location where the terminal member 35 is connected on the lower surface 10*t* side of the base body 10 are different from each other in the base body 10, the first power feeding portion 31 and the second power feeding portion 32 may be located at different positions. The term "different positions" may mean positions that do not overlap in plan view. The first power feeding portion 31 and the second power feeding portion 32 need only be electrically connected with the power feeding portion bonding layer 15 interposed therebetween.

The first power feeding portion 31 and the second power feeding portion 32 are provided to apply a voltage to the first electrode layer 13 from the outside. Since the first electrode layer 13 according to the present embodiment is an adsorption electrode, the number, arrangement, and the like of the first power feeding portions 31 and the second power feeding portions 32 are determined depending on whether the electrostatic chuck is a monopolar type or a bipolar type. Note that the first power feeding portion 31 and the second power feeding portion 32 are provided in the same number. In addition, the power feeding portion bonding layer 15 provided at a connection portion between the first power feeding portion 31 and the second power feeding portion 32 is provided in the same number as the first power feeding portion 31 and the second power feeding portion 32.

The third power feeding portion 33 is fitted into the third plate body 11*c*, and is bonded to the third plate body 11*c* and the second electrode layer 14. The third power feeding portion 33 extends from the second electrode layer 14 to the lower surface 10*t* side of the base body 10. The third power feeding portion 33 is provided to supply an electric current to the second electrode layer 14 from the outside. The number, arrangement, and the like of the third power feeding portions 33 are determined depending on the purpose of using the electrodes.

It is preferable that the first power feeding portion 31, the second power feeding portion 32, and the third power feeding portion 33 are a composite sintered body of an insulating material and a conductive material.

Examples of the insulating material contained in the first power feeding portion 31, the second power feeding portion 32, and the third power feeding portion 33 are the same as the examples of the insulating material contained in the first electrode layer 13, the second electrode layer 14, and the power feeding portion bonding layer 15. That is, the insulating material contained in the first power feeding portion 31, the second power feeding portion 32, and the third power feeding portion 33 is preferably insulating ceramics, and for example, is preferably at least one selected from the group consisting of aluminum oxide ($Al_2O_3$), silicon oxide ($SiO_2$), aluminum nitride (AlN), silicon nitride ($Si_3N_4$), yttrium (III) oxide ($Y_2O_3$), yttrium aluminum garnet (YAG), and $SmAlO_3$.

Among these, the insulating material contained in the first power feeding portion 31, the second power feeding portion 32, and the third power feeding portion 33 is preferably the same material (for example, aluminum oxide) as the main component of the first plate body 11*a*, the second plate body 11*b*, and the third plate body 11*c*. That is, it is preferable that the first power feeding portion 31, the second power feeding portion 32, and the third power feeding portion 33 contain the same material as the main component of the first plate body 11*a*, the second plate body 11*b*, and the third plate body 11*c*. The first power feeding portion 31, the second power feeding portion 32, and the third power feeding portion 33 contain the same material as the main component of the base body 10, so that, during sintering, the main components of the first power feeding portion 31, the second power feeding portion 32, and the third power feeding portion 33 and the main component of the base body 10 can be sintered at the boundary portion with the plate body 11. As a result, it is possible to increase the bonding strength between the first power feeding portion 31, the second power feeding portion 32, and the third power feeding portion 33, and the base body 10.

In addition, examples of the conductive material contained in the first power feeding portion 31, the second power feeding portion 32, and the third power feeding portion 33 are the same as the examples of the conductive material contained in the first electrode layer 13, the second electrode layer 14, and the power feeding portion bonding layer 15. That is, the conductive material contained in the first power feeding portion 31, the second power feeding portion 32, and the third power feeding portion 33 is preferably at least one selected from the group consisting of molybdenum carbide ($Mo_2C$), molybdenum (Mo), tungsten carbide (WC), tungsten (W), tantalum carbide (TaC), niobium carbide (NbC), niobium (Nb), ruthenium (Ru), tantalum (Ta), silicon carbide (SiC), carbon black, carbon nanotubes, and carbon nanofibers.

A ratio (compounding ratio) of the content of the insulating material to the content of the conductive material in the first power feeding portion 31, the second power feeding portion 32, and the third power feeding portion 33 is appropriately adjusted according to the application. The content of the conductive material in the ratio of the content of the insulating material to the content of the conductive material in the first power feeding portion 31, the second power feeding portion 32, and the third power feeding portion 33 is preferably 20% by volume or more and 80% by volume or less, more preferably 23% by volume or more and 60% by volume or less, and still more preferably 25% by volume or more and 50% by volume or less. The ratio may be 30% by volume or more and 45% by volume or less, 33% by volume or more and 40% by volume or less, or the like. By setting the content of the conductive material to 20% by volume or more, the first electrode layer 13, the second electrode layer 14, and the power feeding portion bonding layer 15 can have conductivity. In addition, by setting the content of the conductive material to 80% by volume or less, a difference in thermal expansion with the base body 10 is reduced, and the base body 10 and the power feeding portion 30 can be bonded well.

The compound material constituting the first power feeding portion 31, the second power feeding portion 32, and the third power feeding portion 33 may have different types of materials and different composition ratios.

Densities of the first power feeding portion 31, the second power feeding portion 32, and the third power feeding portion 33 are preferably 96% or more and more preferably 98% or more. By setting the densities of the first power feeding portion 31, the second power feeding portion 32, and the third power feeding portion 33 to the above values, the resistance of the power feeding portion 30 can be reduced even in a case where the amount of the conductive material is reduced, the content of the insulating material which is the same as the main component of the base body 10 can be increased, and the base body 10 and the power feeding portion 30 can be bonded well. In addition, by setting the densities of the first power feeding portion 31, the second power feeding portion 32, and the third power feeding portion 33 to the above values, heat dissipation properties of the power feeding portion 30 can be improved, and a difference in temperature between the power feeding portion 30 and the base body 10 can be reduced.

It is preferable that the power feeding portion 30 is integrally bonded to the plate body 11 and the electrode layers 13 and 14. The phrase "integrally bonded" refers to a state in which a sintered body serving as the plate body 11 and a sintered body serving as the power feeding portion 30 are bonded to each other directly or bonded via the electrode layers 13 and 14 interposed therebetween. In a case where the power feeding portion 30 cannot be integrally bonded, for example, in a case where a formed body (uncalcinated) serving as the plate body 11 and a formed body (uncalcinated) serving as the power feeding portion 30 are simultaneously sintered and integrated, the amount of shrinkage during sintering of the plate body 11 and the power feeding portion 30 is different depending on a location, so that there tends to be problems such as difficulty in forming the power feeding portion 30 into a columnar shape, irregularities between the plate body 11 and the power feeding portion 30, reduction in density of the power feeding portion 30, and inability to increase a proportion of the same main component as the plate body 11 in the power feeding portion 30, which results in reduction in bonding strength between the power feeding portion 30 and the plate body 11. In addition, for the above-described reason, only a power feeding portion 30 having a thickness (outer diameter) of about 1 mm can be produced.

It is preferable that, when the power feeding portion 30 and the plate body 11 are bonded, an outer peripheral surface of the power feeding portion 30 and the plate body 11 are densely bonded. In the present embodiment, the phrase "densely bonded" refers to a state in which the power feeding portion 30 and the plate body 11 are bonded with a small gap at the boundary therebetween. By densely bonding the power feeding portion 30 and the plate body 11, a stress at the time of bonding can be made uniform around the power feeding portion 30, and the bonding between the power feeding portion 30 and the electrode layers 13 and 14 can be made uniform and sufficient. As a result, it is possible to prevent an increase in electrical resistance between the power feeding portion 30 and the electrode layers 13 and 14 when bonding the power feeding portion 30 and the terminal member 35.

Whether the outer peripheral surface of the power feeding portion 30 and the plate body 11 are densely bonded at the boundary therebetween can be confirmed by using an ultrasonic flaw detector. In the present invention, "whether the outer peripheral surface of the power feeding portion 30 and the plate body 11 are densely bonded" is determined by whether 50% or more of the periphery of the power feeding portion 30 is bonded between the power feeding portion 30 and the plate body 11. More specifically, with the ultrasonic flaw detector, measurement is performed by setting an oscillation (ultrasound) frequency to 50 MHz and a focal length to 40 mm, and aligning a focus with a lower surface of the power feeding portion 30 in water. Further, it is determined whether a region in which reflected waves caused by the gap between the power feeding portion 30 and the plate body 11 are confirmed in a range of 1 mm from the outer periphery of the power feeding portion 30 is 50% or less of the entire circumference around the power feeding portion 30. In a case where the region in which the reflected waves are confirmed is 50% or less of the entire circumference, it is determined that "the outer peripheral surface of the power feeding portion 30 and the plate body 11 are densely bonded"

Under the measurement conditions described above using the ultrasonic flaw detector, the region in which the reflected waves caused by the gap between the power feeding portion 30 and the plate body 11 can be confirmed in a range of 1 mm from the outer periphery of the power feeding portion 30 is more preferably 30% or less of the entire circumference, and still more preferably 10% or less of the entire circumference. In a case where the region in which the reflected waves are confirmed is 10% or less of the entire circumference, it can be determined that the outer peripheral surface of the power feeding portion 30 and the plate body 11 are more densely bonded.

It is preferable that the first power feeding portion 31, the second power feeding portion 32, and the third power feeding portion 33 are prepared in advance as a composite sintered body (calcinated), are inserted into the holes provided in the respective plate bodies 11*a*, 11*b*, and 11*c*, and are bonded by sintering under pressure. By bonding the power feeding portion 30 and the plate body 11 through sintering under pressure, the irregularities on the side surface of the power feeding portion 30 can be eliminated, and since the electric current distribution when the electric current flows through the power feeding portion 30 is constant in the vertical direction of the power feeding portion 30, the heat generation in the power feeding portion 30 can be suppressed. In addition, by reducing irregularities on a side surface of the power feeding portion 30, the discharge caused by the electric field concentration can be prevented. In addition, by preferably using a material that has been sintered under pressure in advance, the density of the power feeding portion 30 can be increased. On the other hand, in the method of forming a formed body (uncalcinated) in which each formed body (uncalcinated) serving as the power feeding portion 30 and each formed body (uncalcinated) serving as the plate body 11 are integrated with each other and then performing the sintering, even in a case where formed body densities of the formed body serving as the power feeding portion 30 and the formed body serving as the plate body 11 are adjusted to the same density, the aforementioned effect cannot be obtained because the speed of shrinkage is different in the sintering process, and problems occur such as damage during sintering or insufficient bonding or densification. Therefore, only the power feeding portion 30 having an outer diameter of 1 mm or less can be used.

According to the present embodiment, it is preferable that the first power feeding portion 31, the second power feeding portion 32, and the third power feeding portion 33 are made of a composite sintered body, as with the plate body 11. As a result, the amount of shrinkage of the first power feeding portion 31 when bonding the first power feeding portion 31 to the second plate body 11*b* can be made substantially the same as the amount of shrinkage of the second plate body 11*b*. In addition, the amount of shrinkage of the second power feeding portion 32 and the amount of shrinkage of the third power feeding portion 33 when bonding the second power feeding portion 32 and the third power feeding portion 33 to the third plate body 11*c* can be made substantially the same as the amount of shrinkage of the third plate body 11*c*. Further, since the first power feeding portion 31 and the second power feeding portion 32 are bonded with the power feeding portion bonding layer 15 interposed therebetween, the shrinkage in a direction of pressurization by hot pressing when performing bonding by sintering while applying pressure in the plane of the base body 10 is substantially the same in the plane of the base body 10. Therefore, when performing bonding by hot pressing, a stress applied to the first electrode layer 13, the power feeding portion bonding layer 15, and the first plate body 11*a* from the first power feeding portion 31 and the second power feeding portion 32 can be prevented from being excessively increased or decreased locally.

In a case where the stress between the first electrode layer 13 and the first power feeding portion 31 during the hot pressing is excessively increased, a structure of the first plate body 11*a* in a region directly above the first power feeding portion 31 may be damaged, and the withstand voltage of the first plate body 11*a* may be decreased. On the other hand, in a case where the stress between the first electrode layer 13 and the first power feeding portion 31 during the hot pressing is excessively decreased, adhesiveness between the first electrode layer 13 and the first power feeding portion 31 may be decreased, and the electrical resistance between the first electrode layer 13 and the first power feeding portion 31 may be increased. That is, according to the present embodiment, by making the shrinkage of the base body 10 when the first power feeding portion 31 is bonded by hot pressing substantially the same in the plane of the base body 10, the electrical resistance between the first electrode layer 13 and the first power feeding portion 31 can be reduced while ensuring the withstand voltage of the first plate body 11*a* after the first electrode layer 13 is formed. With such a configuration, according to the present embodiment, it is possible to increase the withstand voltage of the first plate body 11*a*.

The withstand voltage of the first plate body 11*a* at an upper part of the first power feeding portion 31 is preferably 8 kV/mm or higher, more preferably 12 kV/mm or higher, and most preferably 15 kV/mm or higher. By setting the withstand voltage of the first plate body 11*a* at the upper part of the first power feeding portion 31 to 8 kV/mm or higher, the reliability of the electrostatic chuck member 2 can be improved.

Similarly, according to the present embodiment, when performing bonding by hot pressing, a stress applied to the second electrode layer 14 from the third power feeding portion 33 and a stress applied to the power feeding portion bonding layer 15 from the second power feeding portion 32 can be prevented from being excessively increased or decreased locally. Therefore, it is possible to reduce the electrical resistance between the power feeding portion bonding layer 15 and the first power feeding portion 31 and the second power feeding portion 32, and the electrical resistance between the second electrode layer 14 and the third power feeding portion 33 while suppressing a decrease in the withstand voltage of the second plate body 11*b* in a region directly above the third power feeding portion 33. With such a configuration, it is possible to reduce the electrical resistance between the first power feeding portion 31 and the power feeding portion bonding layer 15, the electrical resistance between the second power feeding portion 32 and the power feeding portion bonding layer 15, and the electrical resistance between the second electrode layer 14 and the third power feeding portion 33.

The electrical resistance between the second power feeding portion 32 and the first electrode layer 13 and the electrical resistance between the third power feeding portion 33 and the second electrode layer 14 are preferably 10 MΩ or lower, more preferably 10Ω or lower, still more preferably 1Ω or lower, and still more preferably 0.5Ω or lower. The sample can be adsorbed by an electrostatic chuck by setting the electrical resistance between the power feeding portion 30 and the electrode layers 13 and 14 to 10 MΩ or lower. By setting the electrical resistance to 10Ω or lower, responsiveness when adsorbing the sample can be improved, and by setting the electrical resistance to 1Ω or lower, the deterioration of the temperature uniformity due to the heat generation caused by the resistance can be further prevented, and the power feeding efficiency to the electrode layers 13 and 14 can be improved. In a case where the electrical resistance is 0.5Ω or lower, in the electrode layers 13 and 14, the power feeding portion 30, and the terminal member 35, the electrical resistance of the bonding portion between the respective members can be determined to be equal to or lower than the electrical resistance of each member itself, so that an effect of eliminating the need to consider the heat generation and the electric current loss due to the bonding portion is obtained.

With the electrostatic chuck member 2 according to the present embodiment, the power feeding portion 30 connected to the first electrode layer 13 does not extend through a space between the second plate body 11*b* and the third plate body 11*c*. In the present embodiment, the power feeding portion 30 connected to the first electrode layer 13 is configured by connecting two power feeding portions 30 (the first power feeding portion 31 and the second power feeding portion 32) with the power feeding portion bonding layer 15 between the second plate body 11*b* and the third plate body 11*c*, which is interposed between the two power feeding portions 30. In a case where one power feeding portion 30 that penetrates the second plate body 11*b* and the third plate body 11*c* in succession is prepared and used, such a power feeding portion 30 is difficult to be integrally bonded to the plate body 11. For example, in such a case, in the manufacturing process, it is necessary to bond the power feeding portion 30 to the first electrode layer 13, but in a case where a stress in the thickness direction is applied to the base body 10 at the time of bonding, a load is applied to the first plate body 11*a* in a region directly above the power feeding portion 30, and the withstand voltage of the first plate body 11*a* may be decreased. In addition, the power feeding portion 30 may be damaged due to the stress. According to the present embodiment, the power feeding portion 30 connected to the first electrode layer 13 is divided into the first power feeding portion 31 and the second power feeding portion 32. In addition, the amount of shrinkage in the vertical direction in the bonding surface of the base body 10 is uniform. Therefore, the first power feeding portion 31 can be integrally bonded to the second plate body 11*b*, and the second power feeding portion 32 can be integrally bonded to the third plate body 11*c*. As a result, it is possible to stably bond the first power feeding portion 31 and the first electrode layer 13 without causing damage to the first plate body 11*a*. In addition, by densely bonding the first power feeding portion 31 and the second plate body 11*b* at the boundary therebetween, densely bonding the second power feeding portion 32 and the third plate body 11*c* at the boundary therebetween, and densely bonding the third power feeding portion 33 and the third plate body 11*c* at the boundary therebetween, it is possible to reduce the electrical resistance and to reduce the electrical resistance even after the second power feeding portion 32 and the third power feeding portion 33 are connected to the terminal member 35.

(Terminal Member)

The terminal member 35 is disposed on a lower side of the base body 10. A material constituting the terminal member 35 is optionally selected, but at least one metal selected from copper (Cu), silver (Ag), titanium (Ti), nickel (Ni), niobium (Nb), gold (Au), tungsten (W), tantalum (Ta), molybdenum (Mo), and the like, or an alloy having these as a main component is suitably used.

A lower end surface (end surface) 32*t* of the second power feeding portion 32 and a lower end surface (end surface) 33*t* of the third power feeding portion 33 are disposed on the lower surface 10*t* of the base body 10. The terminal members 35 are connected to the lower end surface 32*t* of the second power feeding portion 32 and the lower end surface 33*t* of the third power feeding portion 33, respectively. A connection structure between the terminal member 35 and the second power feeding portion 32 will be described in more detail below with reference to FIG. 2.

The terminal member 35 is a cylindrical member having at least an upper end portion extending in the up-down direction. The terminal member 35 is inserted into an inside of a terminal through-hole 3*h* that penetrates the base member 3 and a part of the base body 10 in the thickness direction. A terminal insulator 23 having insulating properties is preferably provided on an outer peripheral side of the terminal member 35. The terminal insulator 23 insulates the base member 3 made of metal and the terminal member 35 from each other. The terminal member 35 is connected to an external power supply 21. The terminal member 35 need only be electrically connected to the external power supply 21, and another member may be connected therebetween. A length of the terminal member 35 in the up-down direction does not need to reach a lower surface of the base member 3, and in this case, another conductive member is connected to a lower surface side of the terminal member 35.

(Base Member)

The base member 3 supports the electrostatic chuck member 2 from a lower side. The base member 3 is a disk-shaped metal member in plan view. A material constituting the base member 3 is not particularly limited as long as it is a metal having excellent thermal conductivity, electrical conductivity, and workability, or a compound material containing these metals. As the material constituting the base member 3, for example, a metal such as aluminum (Al), copper (Cu), stainless steel (SUS), or titanium (Ti), an alloy having these metals as a main component, a compound material of these metals and ceramics, or the like is suitably used. The material constituting the base member 3 is preferably an aluminum alloy from the viewpoints of thermal conductivity, electrical conductivity, and workability. At least a surface of the base member 3, which is exposed to plasma, is preferably alumite-treated or resin-coated with a polyimide-based resin. In addition, it is more preferable that the entire surface of the base member 3 is alumite-treated or resin-coated. Since the base member 3 is alumite-treated or resin-coated, plasma resistance of the base member 3 is improved, and abnormal discharge is prevented. Therefore, plasma resistance stability of the base member 3 is improved, and the occurrence of surface damage of the base member 3 can be prevented.

A frame of the base member 3 also functions as an internal electrode for generating plasma. The frame of the base member 3 is connected to an external high-frequency power supply 22 via a matching box (not shown).

The base member 3 is fixed to the electrostatic chuck member 2 by an adhesive. That is, an adhesion layer 55 that adheres the electrostatic chuck member 2 and the base member 3 to each other is provided between the electrostatic chuck member 2 and the base member 3. A heater for heating the electrostatic chuck member 2 may be embedded in an inside of the adhesion layer 55.

Figure 2:
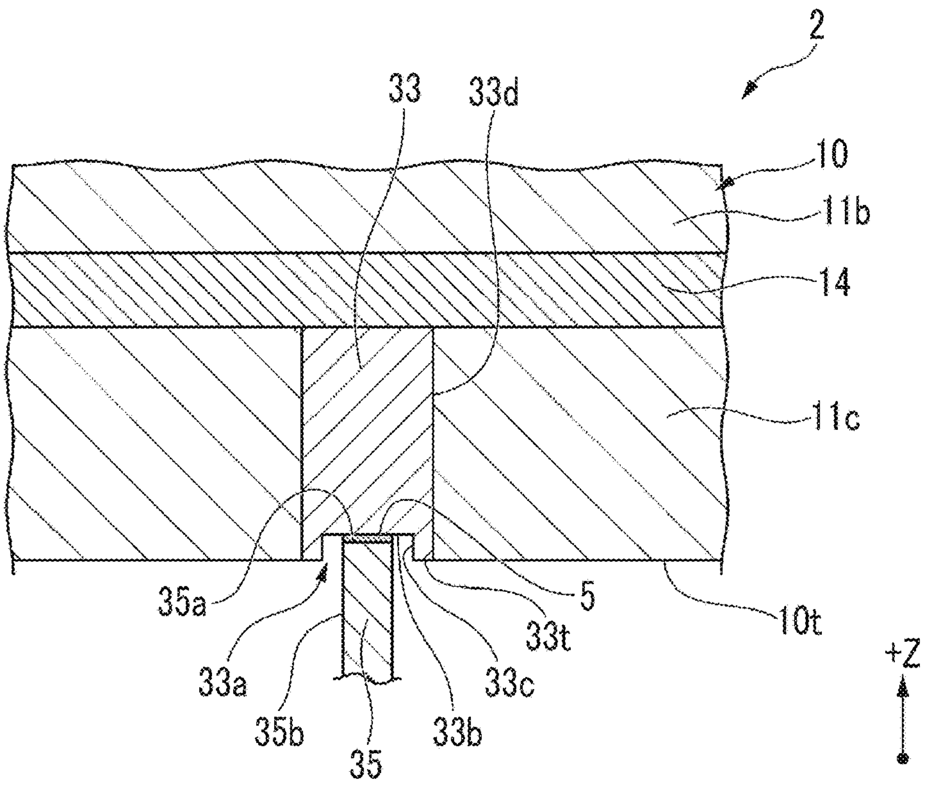
FIG. 2 is a schematic cross-sectional view showing a preferred example of a connection portion between a third power feeding portion and a terminal member according to the embodiment.

Example of Connection Structure Between Power Feeding Portion and Terminal Member FIG. 2 is a schematic cross-sectional view showing an example of a connection portion between the third power feeding portion 33 and the terminal member 35 according to the embodiment. A connection portion between the second power feeding portion 32 and the terminal member 35 may also have the same structure as that in FIG. 2. The connection portion between the second power feeding portion 32 and the terminal member 35 is not shown and description thereof is omitted.

The lower end surface 33*t* of the third power feeding portion 33 is exposed on the lower surface 10*t* of the base body 10. A thickness of the third power feeding portion 33 is equal to or less than a plate thickness of the third plate body 11*c*. A recess 33*a* is provided on the lower end surface 33*t* of the third power feeding portion 33. That is, in plan view, an inner diameter of the recess 33*a* is smaller than the outer diameter of the third power feeding portion 33. The lower end surface 33*t* according to the present embodiment is circular as viewed from the lower side. In addition, the recess 33*a* is disposed at the center of the lower end surface 33*t* and is circular as viewed from the lower side. A depth of the recess 33*a* is equal to or less than ½ of the plate thickness of the third plate body 11*c*. Therefore, a bottom surface 33*b* of the recess 33*a* is located on the lower surface 10*t* side with respect to a halfway position between the lower surface 10*t* of the base body 10 and the second electrode layer 14. The depth of the recess 33*a* may be equal to or less than ⅓, equal to or less than ¼, equal to or less than ⅕, equal to or less than ⅛, equal to or less than 1/10, or equal to or less than 1/20 of the plate thickness of the third plate body 11*c*.

The terminal member 35 according to the present embodiment has a cylindrical shape at least at the upper end portion. An outer diameter of the upper end portion of the terminal member 35 is preferably slightly smaller than the inner diameter of the recess 33*a*. The upper end portion of the terminal member 35 is disposed inside the recess 33*a*. The upper end portion of the terminal member 35 and the bottom surface 33*b* of the recess 33*a* are connected by brazing. That is, the third power feeding portion 33 and the terminal member 35 are connected by brazing at a brazed portion 5 using an optionally selected brazing material. The brazed portion 5 is provided between an upper end surface 35*a* of the terminal member 35 and the bottom surface 33*b* of the recess 33*a*. Further, the brazed portion 5 may also be provided to spread between an outer peripheral surface 35*b* in the vicinity of the upper end portion of the terminal member 35 and an inner peripheral surface 33*c* of the recess 33*a*. That is, it is preferable that the brazed portion 5 is disposed inside the recess 33*a*.

The outer diameter of the upper end portion of the terminal member 35 can be optionally selected, and may be, for example, 0.5 mm or more, 1 mm or more, 3 mm or more, 5 mm or more, 7 mm or more, 10 mm or more, or 15 mm or more, but is not limited to these examples.

As a brazing material constituting the brazed portion 5, a known material in the related art, such as indium, aluminum, gold, silver, copper, titanium, nickel, or an alloy of these, can be adopted.

As described above, the outer diameter of the third power feeding portion 33 according to the present embodiment is 2 mm or more, and more preferably 4 mm or more. Therefore, it is easy to ensure a large cross-sectional area of the connection portion between the third power feeding portion 33 and the terminal member 35, and it is possible to suppress the electrical resistance of the connection portion. As a result, it is possible to set the electrical resistance between the third power feeding portion 33 and the terminal member 35 (that is, the electrical resistance of the brazed portion 5) to 1Ω or lower, and to improve the power feeding efficiency to the second electrode layer 14. Similarly, since the outer diameter of the second power feeding portion 32 is also 2 mm or more, and more preferably 4 mm or more, it is possible to set the electrical resistance between the second power feeding portion 32 and the terminal member 35 (that is, the electrical resistance of the brazed portion 5) to 1Ω or lower, and to improve the power feeding efficiency to the first electrode layer 13. The electrical resistance of the brazed portion 5 may be 0.8Ω or lower, 0.6Ω or lower, 0.5Ω or lower, 0.4Ω or lower, 0.2Ω or lower, or 0.1Ω or lower.

It is preferable that 50% or more of an area of the power feeding portion 30 is bonded to the terminal member 35 using a brazing agent, it is more preferable that 65% or more of the area of the power feeding portion 30 is bonded to the terminal member 35 by the brazing agent, and it is still more preferable that 80% or more of the area of the power feeding portion 30 is bonded to the terminal member 35 by the brazing agent. Whether or not 50% or more of an area of the power feeding portion 30 is bonded to the terminal member 35 by the brazing agent is confirmed by an ultrasonic flaw detector, and can be confirmed with the ultrasonic flaw detector by performing measurement by setting an oscillation (ultrasound) frequency to 50 MHz and a focal length to 40 mm, and aligning a focus with a lower surface of the terminal member 35 in water. In the measurement, a region in which reflected waves caused by the gap are not confirmed on the lower surface of the power feeding portion 30 can be determined as a region in which 50% or more of the area of the terminal member 35 is bonded to the power feeding portion 30. In a case where 50% or more of the area of the power feeding portion 30 is bonded to the terminal member 35 by the brazing agent, the bonding strength of the terminal member 35 can be increased, and the electrical resistance between the terminal member 35 and the power feeding portion 30 can be reduced.

As described above, the depth of the recess 33*a* is equal to or lower than ½ of the plate thickness of the third plate body 11*c*. Therefore, the brazed portion 5 is located on the lower surface 10*t* side with respect to the halfway position between the lower surface 10*t* of the base body 10 and the second electrode layer 14. According to the present embodiment, by making the depth of the recess 33*a* sufficiently shallow, a decrease in heat capacity of the electrostatic chuck member 2 in the vicinity of the brazed portion 5 or deterioration in the heat transfer can be suppressed. As a result, it is possible to improve the temperature uniformity of the electrostatic chuck member 2.

Further, a depth of the bottom surface 33*b* of the recess 33*a* (a distance in the vertical direction from the lower surface 10*t* of the base body 10) is preferably 0 mm or more and 2 mm or less, more preferably 0 mm or more and 1 mm or less, and still more preferably 0.05 mm or more and 0.5 mm or less. By setting the depth of the bottom surface 33*b* of the recess 33*a* to the above value, the deterioration of the temperature uniformity due to the recess 33*a* can be further prevented. In addition, by setting the depth of the recess 33*a* to 0.05 mm or more, the power feeding portion 30 and the terminal member 35 can be bonded well, and the discharge caused by the connection portion can be prevented.

As for the temperature uniformity, when an upper surface of the base body 10 is kept at a constant temperature by using the base body 10 as an electrostatic chuck, a difference between a temperature at a position above the power feeding portion 30 and a temperature at another part on the upper surface of the base body 10 is preferably 2° C. or lower, and most preferably 1° C. or lower.

In the present embodiment, a case in which the terminal is bonded to both the second power feeding portion 32 and the third power feeding portion 33 by brazing has been described, but in a case where a use temperature of the electrostatic chuck is low, or the like, at least one terminal member 35 may be brazed, and an other terminal member 35 may be adhered by another method such as adhesion with a conductive adhesive. In this case as well, it is preferable that both the terminal member 35 connected to the second power feeding portion 32 and the terminal member 35 connected to the third power feeding portion 33 are located on the lower side of the second electrode layer 14, and it is more preferable that the depths of all the recesses 33*a* are equal to or less than the above value.

The third power feeding portion 33 according to the present embodiment is integrally bonded to the third plate body 11*c*. Therefore, a gap is difficult to be formed between an outer peripheral surface 33*d* of the third power feeding portion 33 and the third plate body 11*c*, and the brazing material is difficult to enter between the outer peripheral surface 33*d* of the third power feeding portion 33 and the base body 10 during the brazing. When the brazing material is disposed between the outer peripheral surface 33*d* of the third power feeding portion 33 and the base body 10, a thermal stress is applied to the third power feeding portion 33 due to a difference in coefficient of thermal expansion or the like, and the third power feeding portion 33 may be damaged. According to the present embodiment, by integrally bonding the third power feeding portion 33 to the third plate body 11*c*, the occurrence of a gap between the third power feeding portion 33 and the third plate body 11*c* can be suppressed, and the reliability of the third power feeding portion 33 can be improved.

In addition, in a case where a gap is provided between the outer peripheral surface 33*d* of the third power feeding portion 33 and the third plate body 11*c*, the third power feeding portion 33 is deformed to the gap side when the second electrode layer 14 is sintered while being pressurized by hot pressing, so that the pressure between the third power feeding portion 33 and the second electrode layer 14 is reduced, thereby reducing the adhesiveness. As a result, there is a concern that an increase in electrical resistance occurs as well as a decrease in bonding strength between the second electrode layer 14 and the third power feeding portion 33 to be formed.

According to the present embodiment, since the formation of the gap between the outer peripheral surface 33*d* of the third power feeding portion 33 and the base body 10 is suppressed, a sufficiently large pressure can be applied to a boundary between the second electrode layer 14 and the third power feeding portion 33 when the second electrode layer 14 is formed, and the bonding strength between the third power feeding portion 33 and the second electrode layer 14 can be increased, and the increase in electrical resistance can be suppressed.

According to the present embodiment, by densely bonding an outer peripheral surface 32*d* of the second power feeding portion 32 and the third plate body 11*c* at a boundary therebetween, the bonding strength between the second power feeding portion 32 and the power feeding portion bonding layer 15 is increased, and the electrical resistance is reduced. In addition, by suppressing formation of a gap at a boundary between an outer peripheral surface 31*d* of the first power feeding portion 31 and the second plate body 11*b*, the bonding strength between the first power feeding portion 31 and the power feeding portion bonding layer 15 and the bonding strength between the first power feeding portion 31 and the first electrode layer 13 are increased, and the electrical resistance is reduced.

According to the present embodiment, by densely bonding the outer peripheral surface 33*d* of the third power feeding portion 33 and the third plate body 11*c* at a boundary therebetween, the entrance of the brazing material between the outer peripheral surface 33*d* of the third power feeding portion 33 and the third plate body 11*c* during the brazing can be sufficiently suppressed, and the adhesiveness with the third power feeding portion 33 when forming the second electrode layer 14 by hot pressing can be improved.

According to the present embodiment, the brazed portion 5 is disposed inside the recess 33*a*. Therefore, the brazed portion 5 does not protrude downward with respect to the lower surface 10*t* of the base body 10. Therefore, the interference between an upper surface of the base member 3 disposed on the lower side of the base body 10 and the brazed portion 5 can be suppressed. In addition, the application of a load to the brazed portion 5 in an assembling process can be suppressed. In addition, the discharge between the brazed portion 5 and the base member 3 can be suppressed.

The brazed portion 5 according to the present embodiment is surrounded by the inner peripheral surface 33*c* of the recess 33*a*, so that the brazing material is difficult to protrude to an outside of the recess 33*a* during the brazing. Therefore, even in a case where there is a gap at a boundary between the third power feeding portion 33 and the base body 10, the brazing material is difficult to flow into the gap, and the reliability of the third power feeding portion 33 can be improved.

Figure 3:
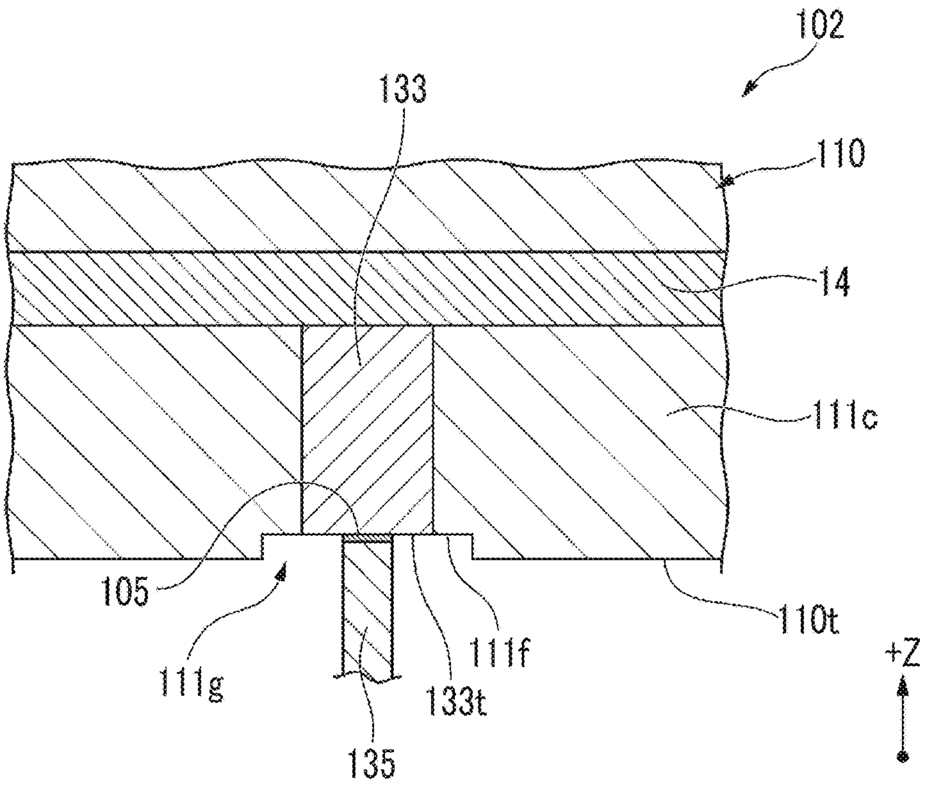
FIG. 3 is a schematic cross-sectional view showing a connection portion between a third power feeding portion and a terminal member according to Modification Example 1.

Modification Example 1 of Connection Structure Between Power Feeding Portion and Terminal Member FIG. 3 is a schematic cross-sectional view showing an example of a connection portion between a third power feeding portion 133 and a terminal member 135 according to Modification Example 1, which can be adopted in the above-described embodiment.

Constituent elements having the same configuration as the constituent elements of the above-described embodiment are denoted by the same reference numerals, and the description thereof is omitted. Unless otherwise specified, preferred numerical values and conditions such as the size in the example described above may be used in the present modification example 1.

In addition, the configuration of the present modification example may be adopted in the connecting portion between the second power feeding portion 32 and the terminal member 135 in the above-described embodiment.

In the present modification example, a recess 111*g* is provided on a lower surface 110*t* of a base body 110. The recess 111*g* is circular as viewed from the lower side. A depth of the recess 111*g* is equal to or less than ½ of a plate thickness of a third plate body 111*c*. Therefore, a bottom surface 111*f* of the recess 111*g* is located on the lower surface 110*t* side with respect to a halfway position between the lower surface 110*t* of the base body 110 and the second electrode layer 14.

The third power feeding portion 133 is exposed on the bottom surface 111*f* of the recess 111*g*. A lower end surface 133*t* of the third power feeding portion 133 is disposed at the center of the bottom surface 111*f*. The terminal member 135 according to the present modification example has a cylindrical shape. An outer diameter of the terminal member 135 is smaller than an inner diameter of the recess 111*g*. An upper end portion of the terminal member 135 is disposed inside the recess 111*g* as viewed in the thickness direction. The outer diameter of the terminal member 135 is smaller than an outer diameter of the third power feeding portion 133. A thickness of the third power feeding portion 133 is smaller than the plate thickness of the third plate body 111*c*. In plan view, the inner diameter of the recess 111*g* is larger than the outer diameter of the third power feeding portion 133.

The upper end portion of the terminal member 135 and the lower end surface 133*t* of the third power feeding portion 133 are connected by brazing to form a brazed portion 105. The brazed portion 105 is disposed inside the recess 111*g*.

As described above, the depth of the recess 111*g* is equal to or less than ½ of the plate thickness of the third plate body 111*c*. Therefore, the brazed portion 105 is located on the lower surface 110*t* side with respect to the halfway position between the lower surface 110*t* of the base body 110 and the second electrode layer 14. According to the present modification example, by making the depth of the recess 111*g* sufficiently shallow, a decrease in heat capacity of an electrostatic chuck member 102 in the vicinity of the brazed portion 105 can be suppressed. As a result, it is possible to improve the temperature uniformity of the electrostatic chuck member 102.

In the present modification example, the outer diameter of the terminal member 135 can be made substantially the same as the outer diameter of the power feeding portion 133 or larger than the outer diameter of the power feeding portion 133. By making the outer diameter of the terminal member 135 substantially the same as the outer diameter of the power feeding portion 133 or larger than the outer diameter of the power feeding portion 133, an electric current distribution on a lower surface of the power feeding portion 133 can be made uniform, and deterioration of the temperature uniformity due to the heat generation of the power feeding portion 133 can be prevented. In addition, the bonding strength between the power feeding portion 133 and the terminal member 135 can be increased by increasing the outer diameter of the brazed portion 105.

In addition, in the present modification example, the brazed portion 105 may be located on a boundary between the terminal member 135 and the plate body 11, but the outer peripheral surface 32*d* and the base body 110 are densely bonded at a boundary therebetween, so that an increase in electrical resistance due to the brazing can be suppressed.

According to the present modification example, since the brazed portion 105 is disposed inside the recess 111*g*, the brazed portion 105 does not protrude downward with respect to the lower surface 110*t* of the base body 110. In addition, the application of a load to the brazed portion 105 in an assembling process can be suppressed.

Therefore, the interference between an upper surface of the base member 3 disposed on the lower side of the base body 110 and the brazed portion 105 can be suppressed. In addition, the discharge between the brazed portion 105 and the base member 3 can be suppressed.

Figure 4:
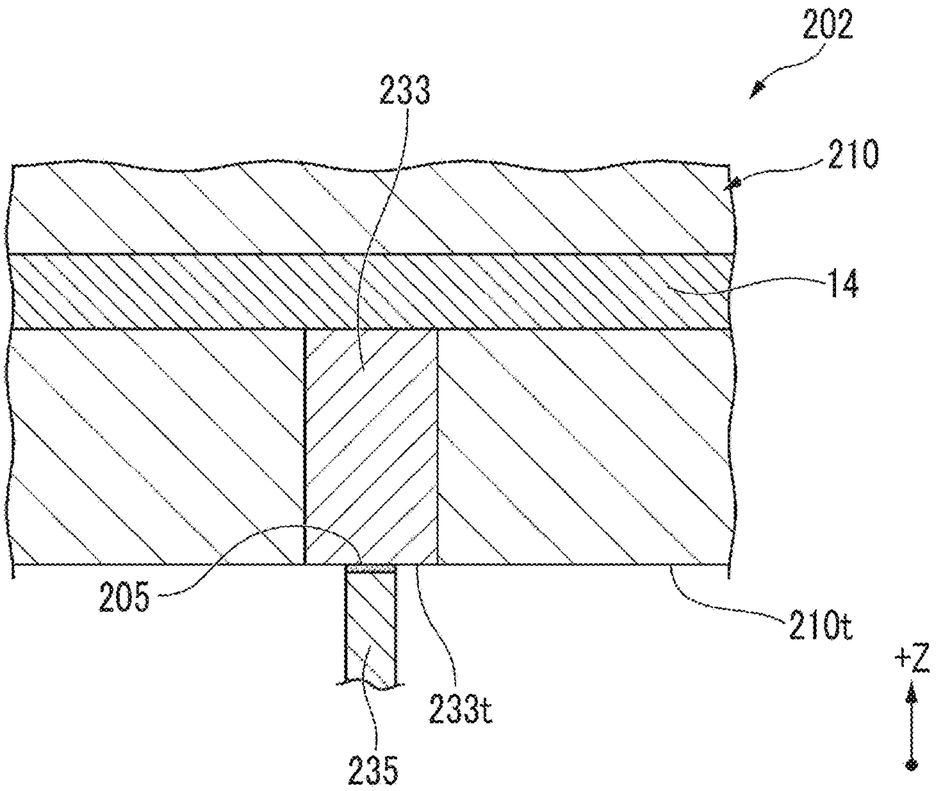
FIG. 4 is a schematic cross-sectional view showing a connection portion between a third power feeding portion and a terminal member according to Modification Example 2.

Modification Example 2 of Connection Structure Between Power Feeding Portion and Terminal Member FIG. 4 is a schematic cross-sectional view of a connection portion between a third power feeding portion 233 and a terminal member 235 according to Modification Example 2, which can be adopted in the above-described embodiment. The connection portion of the present modification example is different from the modification example 1 in that a recess is not provided in a lower surface 210*t* of a base body 210.

Constituent elements having the same configuration as the constituent elements of the above-described embodiment are denoted by the same reference numerals, and the description thereof is omitted. In addition, the configuration of the present modification example may be adopted in the connecting portion between the second power feeding portion 32 and the terminal member 235 in the above-described embodiment. Unless otherwise specified, preferred numerical values and conditions such as the size in the example described above may be used in the present modification example 2.

In the present modification example, the third power feeding portion 233 is exposed on the lower surface 210*t* of the base body 210. An upper end portion of the terminal member 235 and the lower end surface 233*t* of the third power feeding portion 233 are connected by brazing to form a brazed portion 205. A thickness of the third power feeding portion 233 is the same as the plate thickness of the third plate body. Therefore, the brazed portion 205 according to the present modification example is located on the lower surface 210*t* side with respect to a halfway position between the lower surface 210*t* of the base body 210 and the second electrode layer 14. According to the present modification example, since neither the lower surface of the base body 210 nor a lower surface of the third power feeding portion 233 is provided with a recess, a decrease in heat capacity of an electrostatic chuck member 202 in the vicinity of the brazed portion 205 can be suppressed. As a result, it is possible to improve the temperature uniformity of the electrostatic chuck member 202.

<Manufacturing Method of Electrostatic Chuck Member>

Next, an example of a manufacturing method of the electrostatic chuck member 2 according to the present embodiment will be described with reference to FIG. 1 and the like. The manufacturing method of the electrostatic chuck member 2 according to the present embodiment preferably includes a plate body sintering step, a power feeding portion sintering step, a machining step, a printing step (preferably, a screen printing step), a bonding and sintering step, and a brazing step.

The plate body sintering step and the power feeding portion sintering step may be performed in any order, or may be performed simultaneously. The machining step is performed after the plate body sintering step and the power feeding portion sintering step. The printing step, preferably the screen printing step, is performed after the machining step. The bonding and sintering step is performed after the screen printing step or the like. The brazing step is performed after the bonding and sintering step.

In the following description, it is assumed that the forming materials of the first plate body 11*a*, the second plate body 11*b*, and the third plate body 11*c* are aluminum oxide-silicon carbide ($Al_2O_3$—SiC) composite sintered bodies, the first insulating bonding layer 16*d* and the second insulating bonding layer 16*e* are aluminum oxide sintered bodies, and the forming materials of the first electrode layer 13, the second electrode layer 14, the power feeding portion bonding layer 15, the first power feeding portion 31, the second power feeding portion 32, and the third power feeding portion 33 are aluminum oxide-tantalum carbide ($Al_2O_3$—TaC) composite sintered bodies.

(Plate Body Sintering Step)

The plate body sintering step is a step of obtaining ceramic plates serving as the first plate body 11*a*, the second plate body 11*b*, and the third plate body 11*c* by sintering. In the plate body sintering step, first, a mixed powder containing silicon carbide powder and aluminum oxide powder is formed into a disk shape to form a formed body (unsintered). Thereafter, using a hot press device, the formed body is sintered at a pressure of 1 MPa to 50 MPa, for example, at a temperature of 1500° C. to 2000° C., in a non-oxidative atmosphere, preferably in an inert atmosphere, for a predetermined time while being pressurized, thereby obtaining composite sintered bodies serving as the first plate body 11*a*, the second plate body 11*b*, and the third plate body 11*c*.

(Power Feeding Portion Sintering Step)

The power feeding portion sintering step is a step of obtaining conductive sintered bodies serving as the first power feeding portion 31, the second power feeding portion 32, and the third power feeding portion 33 by sintering. In the power feeding portion sintering step, first, a mixed powder containing aluminum oxide powder and tantalum carbide is formed into a desired shape such as a disk shape or a column shape to form a formed body (unsintered). Thereafter, using a hot press device, the formed body is sintered at a pressure of 1 MPa to 50 MPa, for example, at a temperature of 1500° C. to 2000° C., in a non-oxidative atmosphere, preferably in an inert atmosphere, for a predetermined time while being pressurized, thereby obtaining composite conductive sintered bodies serving as the first power feeding portion 31, the second power feeding portion 32, and the third power feeding portion 33.

(Machining Step)

The machining step preferably includes a disk machining procedure of machining the composite sintered bodies serving as the first plate body 11*a*, the second plate body 11*b*, and the third plate body 11*c* into a disk shape having a desired shape and condition, a perforation procedure of providing the first through-hole 12*a* in the obtained second plate body 11*b* and providing the second through-hole 12*b* and the third through-hole 12*c* in the obtained third plate body 11*c*, and a power feeding portion machining procedure of machining the first power feeding portion 31, the second power feeding portion 32, and the third power feeding portion 33 into a desired shape and condition.

The disk machining procedure and the power feeding portion machining procedure are procedures of machining the sintered bodies into a desired shape or state such as a disk shape or a cylindrical shape by using a machining device for general ceramics, such as a machining device using diamond abrasive grains or the like or a laser machining device.

The perforation procedure is performed after the disk machining procedure. The perforation procedure is a procedure of forming the first through-hole 12*a*, the second through-hole 12*b*, and the third through-hole 12*c* by hole drilling machining using a diamond drill, a laser machining method, a discharge machining method, an ultrasonic machining method, or the like.

In the machining step, it is preferable that a boundary between the first through-hole 12*a* and the first power feeding portion 31, a boundary between the second through-hole 12*b* and the second power feeding portion 32, and a boundary between the third through-hole 12*c* and the third power feeding portion 33 are provided with intervals such that diameters of the through-holes are values larger than outer diameters of the power feeding portions by 0.03 mm or more and less than 0.1 mm.

By setting the diameters of the through-holes 12*a*, 12*b*, and 12*c* after the machining step (for example, before the screen printing step) to values larger than the outer diameter of the power feeding portion 30 after the machining step by 0.03 mm or more, the plate body 11 and the power feeding portion 30 can be prevented from being damaged when performing pressurization in the bonding and sintering step described below.

In addition, by setting the diameters of the through-holes 12*a*, 12*b*, and 12*c* after the machining step to be from values larger than the outer diameter of the power feeding portion 30 after the machining step by less than 0.1 mm, the through-holes 12*a*, 12*b*, and 12*c* and the power feeding portion 30 after the bonding and sintering step can be densely bonded at the boundaries therebetween. As a result, it is easy to set a region in which reflected waves around the power feeding portion 30 are confirmed in an ultrasonic flaw detection test at the boundaries between the through-holes 12*a*, 12*b*, and 12*c* and the power feeding portion 30 to 50% or less.

A difference between the diameters of the through-holes 12*a*, 12*b*, and 12*c* and the outer diameter of the power feeding portion 30 after the machining step differs in optimal value depending on the outer diameter or the thickness of the power feeding portion 30, the conditions of the printing step and the bonding and sintering step, the accuracy of the machining device used, and the like. Therefore, the values need only be appropriately selected such that the region in which the reflected waves around the power feeding portion 30 are confirmed in the ultrasonic flaw detection test at the boundaries between the through-holes 12*a*, 12*b*, and 12*c* and the power feeding portion 30 after the bonding and sintering step to 50% or less of the entire circumference.

After the machining step, a disposition step of placing the first power feeding portion 31, the second power feeding portion 32, and the third power feeding portion 33 in the first through-hole 12*a*, the second through-hole 12*b*, and the third through-hole 12*c* may be provided. The disposition step may be performed after the following printing step.

(Printing Step, Preferably Screen Printing Step)

Figure 5:
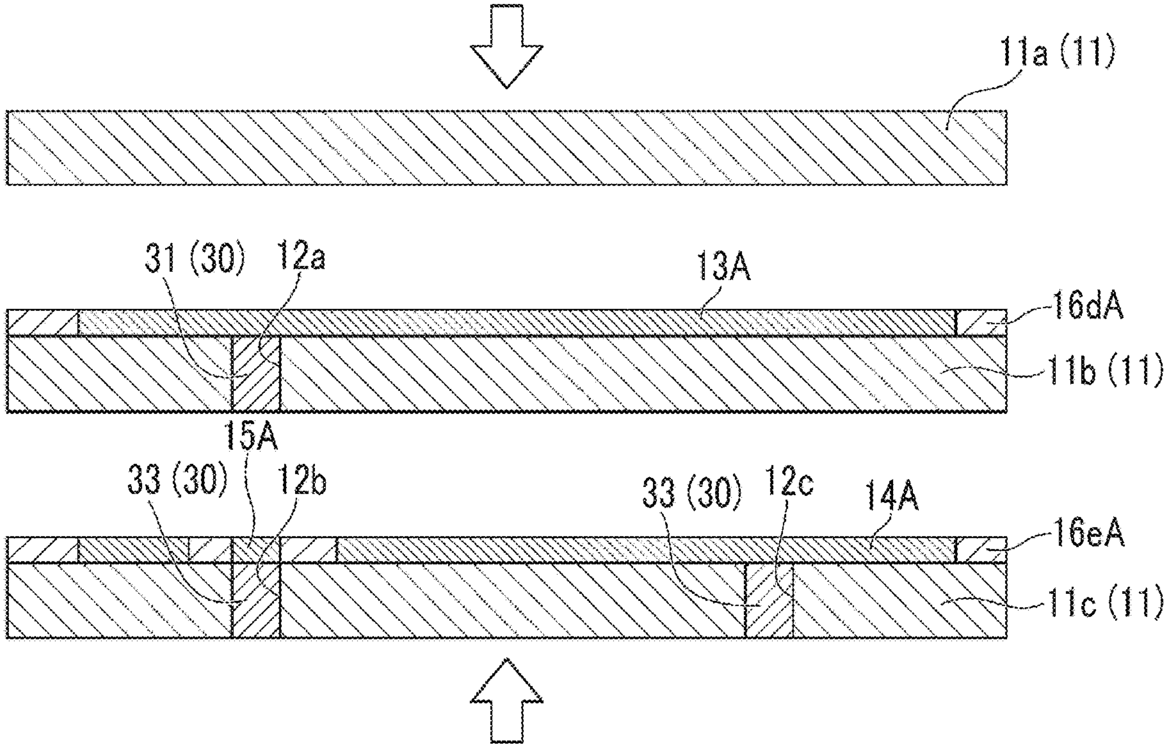
FIG. 5 is a schematic cross-sectional view showing an example of the manufacturing method of an electrostatic chuck member according to the embodiment.

The printing step, preferably the screen printing step is a step of forming the electrode layer (before sintering), the insulating layer (before sintering), and the power feeding portion bonding layer (before sintering) by applying an insulating layer paste 16*d*A or 16*e*A for forming the insulating bonding layer 16 or conductive layer pastes (electrode layer pastes 13A and 14A and power feeding portion bonding layer paste 15A) for forming the electrode layers 13 and 14 and the power feeding portion bonding layer 15 to a desired position of the second plate body 11*b* or the third plate body 11*c* by printing, preferably screen printing, to form a layer, and then drying and volatilizing a solvent contained in the paste (see FIG. 5). The insulating layer pastes 16*d*A and 16*e*A are made of raw material powders and a solvent of the insulating layer, and are subjected to the bonding and sintering step to form the insulating bonding layer 16 (after sintering). The conductive layer pastes 13A, 14A, and 15A are made of raw material powders and a solvent of the electrode layers 13 and 14 and the power feeding portion bonding layer 15, and are subjected to a bonding and sintering step to form the electrode layers 13 and 14 or the power feeding portion bonding layer 15 (after sintering). Hereinafter, a case where the same paste (conductive layer pastes 13A, 14A, and 15A) is used for the electrode layer pastes 13A, 14A, and 15A and the power feeding portion bonding layer paste 15A will be described. However, different materials may be used for the electrode layer pastes 13A and 14A and the power feeding portion bonding layer paste 15A.

The solvent used for the paste can be optionally selected, and it is preferable to use a solvent having a boiling point of about 150° C. to 250° C. and having a small amount of residue after drying. A dispersing agent such as a silane coupling agent or a surfactant may be added to the paste in order to improve dispersibility of the powder, a binder or the like may be added to the paste used for screen printing or the like after drying the paste so that the powder does not scatter, or a commercially available solvent for screen printing or the like may be used.

The insulating layer pastes 16*d*A and 16*e*A serving as the first insulating bonding layer 16*d* and the conductive layer pastes 13A, 14A, and 15A serving as the first electrode layer 13 are printed by screen printing or the like on a surface on the first plate body 11*a* side of the second plate body 11*b* in which the first power feeding portion 31 is inserted into the first through-hole 12*a*, and applied in a desired shape and thickness. It is preferable that the insulating layer pastes 16*d*A and 16*e*A and the conductive layer pastes 13A, 14A, and 15A are applied so as not to contact each other.

The drying after the screen printing or the like need only be performed at a temperature at which the solvent is volatilized, and is preferably performed in a vacuum at a temperature of, for example, 100° C. to 300° C.

A thickness of the applied insulating layer pastes 16*d*A and 16*e*A and conductive layer pastes 13A, 14A, and 15A after drying is preferably 5 μm or more and 500 μm or less, and more preferably 10 μm or more and 250 μm or less. By setting the thickness to 5 μm or more, the bonding strength between the plate bodies 11 can be ensured, and the resistance of the electrode layers 13 and 14 and the power feeding portion bonding layer 15 can be reduced. On the other hand, in a case where the thickness is more than 500 μm, the number of insulating layers exposed to an outer peripheral portion of the base body 10 increases, which may reduce the plasma resistance of the base body 10, so that it is preferable to set the thickness to 500 μm or less.

In addition, the conductive layer pastes 13A, 14A, and 15A after drying may be made thicker than the insulating layer pastes 16*d*A and 16*e*A after drying. By making the conductive layer pastes 13A, 14A, and 15A after drying thicker than the insulating layer pastes 16*d*A and 16*e*A after drying, the conduction between the electrode layers 13 and 14, the power feeding portion bonding layer 15, and the power feeding portion 30 can be reliably ensured. However, even in a case where the conductive layer pastes 13A, 14A, and 15A after drying are thinner than the insulating layer pastes 16*d*A and 16*e*A after drying, relatively good conduction can be ensured as long as the thicknesses are similar to each other. In addition, in a case where the thicknesses of the conductive layer pastes 13A, 14A, and 15A after drying are made too thicker, a gap is likely to be generated at the boundary between the insulating bonding layer 16 and the plate body 11, and the withstand voltage of the base body 10 may be decreased. In addition, in the present embodiment, the thicknesses of the conductive layer pastes 13A, 14A, and 15A after drying are preferably 90% or more and 120% or less, more preferably 95% or more and 110% or less, and still more preferably 100% or more and 110% or less, with respect to the thicknesses of the insulating layer pastes 16*d*A and 16*e*A after drying.

A formed body density (density of the formed body (unsintered)) of each paste after drying is considered. The formed body density after drying is a ratio of the density to the density after complete densification densified by sintering, and is expressed in percentage. The formed body density of the paste after drying can be obtained by using the thickness and weight of the paste after drying.

Here, the formed body density of the conductive layer pastes 13A, 14A, and 15A after drying is referred to as a first formed body density P13. In addition, the formed body density of the insulating layer pastes 16*d*A and 16*e*A after drying is referred to as a second formed body density P16.

In the present embodiment, it is preferable that the first formed body density P13 is a value equal to or lower than the second formed body density P16 (P13≤P16). Further, a difference between the first formed body density P13 and the second formed body density P16 is preferably 0% or more and 20% or less (0%≤P16−P13≤20%), and more preferably 0.5% or more and 10% or less (0.5%≤P16−P13≤10%).

In general, the larger the formed body density (that is, the closer the formed body density is to 100%), the smaller the amount of shrinkage during sintering. Therefore, in a case where the first formed body density P13 is made larger than the second formed body density P16 (P13>P16), in the bonding and sintering step, the amount of shrinkage of the conductive layer pastes 13A, 14A, and 15A is smaller than the amount of shrinkage of the insulating layer pastes 16*d*A and 16*e*A. In such a density condition, in a case where the thicknesses of the conductive layer pastes 13A, 14A, and 15A after drying are set to be equal to or more than the thicknesses of the insulating layer pastes 16*d*A and 16*e*A after drying, the electrode layers 13 and 14 and the power feeding portion bonding layer 15 become thicker than the insulating bonding layer 16 after bonding and sintering. As a result, the stress applied to the plate body 11 on the power feeding portion 30 increases during bonding and sintering, the withstand voltage of the plate body 11 deteriorates. Further, the stress applied to the insulating bonding layer 16 decreases, and the withstand voltage of the insulating layer also deteriorates.

On the other hand, even in a case where the first formed body density P13 is a value equal to or lower than the second formed body density P16, when the difference therebetween is too large (for example, more than 20%), the electrode layers 13 and 14 and the power feeding portion bonding layer 15 may become too thinner than the insulating bonding layer 16 after bonding and sintering, and the electrical resistance between the power feeding portion 30 and the electrode layers 13 and 14 and the power feeding portion bonding layer 15 may deteriorate.

By setting the difference between the first formed body density P13 and the second formed body density P16 to the above-described range, the insulating bonding layer 16 is sufficiently densified in the bonding and sintering step to increase the withstand voltage, the electrode layers 13 and 14 and the power feeding portion bonding layer 15 are well bonded to the plate body 11 and the power feeding portion 30 to reduce the electrical resistance, and the withstand voltage of the plate body 11 on the power feeding portion 30 can be maintained in good condition.

In general, the formed body density is lower as a particle size distribution of the powder to be formed is narrower, and the formed body density is higher in a powder having a wider particle size distribution. The conductive layer pastes 13A, 14A, and 15A, which are a mixture of insulating powder and conductive powder, have a wider particle size distribution than the insulating layer pastes 16*d*A and 16*e*A using a single insulating powder. Therefore, the formed body using the conductive layer paste has a higher formed body density (is more dense). Therefore, by using insulating powder and conductive powder having values of particle diameters close to each other as the insulating powder and the conductive powder used for the conductive layer pastes 13A, 14A, and 15A, the particle size distribution can be narrowed, and the formed body density of the conductive layer pastes 13A, 14A, and 15A after drying can be reduced. As other methods of reducing the formed body density of the conductive layer pastes 13A, 14A, and 15A after drying, a method of adding powder with a low bulk density to the powder used for the conductive layer pastes 13A, 14A, and 15A, or the like is also possible. As the powder with a low bulk density, aluminum oxide powder with a γ-type crystal phase or the like is suitably used, and as the insulating powder, a mixture of aluminum oxide powder with an α-type crystal phase and γ-type aluminum oxide powder is preferably used. Since the γ-type aluminum oxide powder has strong cohesiveness and low bulk density, even in a case of being added to the α-type aluminum oxide powder, an effect of reducing the formed body density of the paste can be obtained. The γ-type aluminum oxide powder undergoes a phase transition by being heated in the bonding and sintering step, and becomes α-type aluminum oxide powder. In addition, it is preferable to use powder having a small particle diameter as insulating powder used for the insulating layer pastes 16*d*A and 16*e*A. Since powder having a small particle diameter has higher activity during sintering than powder having a large particle diameter, by reducing the particle diameter of the insulating powder used for the insulating layer pastes 16*d*A and 16*e*A, the withstand voltage after bonding the base body 10 and the insulating bonding layer 16 can be increased in the bonding and sintering step. A proportion of the γ-type aluminum oxide powder can be optionally selected, and for example, a mass ratio of the α-type aluminum oxide powder to the γ-type aluminum oxide powder may be 99:1 to 90:10, or may be 98:2 to 95:5, but is not limited to these examples.

In the printing step, the insulating layer paste 16*d*A and the conductive layer paste 13A may be applied to the second plate body 11*b*, or may be applied to the first plate body 11*a*. In addition, the insulating layer paste 16*e*A and the conductive layer pastes 14A and 15A may be applied to the third plate body 11*c*, or these may be applied to the second plate body 11*b*.

(Bonding and Sintering Step)

A bonding and sintering procedure is a procedure of overlapping the first plate body 11*a*, the second plate body 11*b*, and the third plate body 11*c* with surfaces to which the paste is applied interposed therebetween, and hot pressing the plate bodies under a high temperature and a high pressure to integrally bond the plate bodies. After the paste is applied, it is dried before bonding as necessary.

More specifically, as shown in FIG. 5, the bonding and sintering step according to the present embodiment is a step of bonding and integrating the first plate body 11*a*, the second plate body 11*b*, the third plate body 11*c*, the first power feeding portion 31 inserted into the first through-hole 12*a* of the second plate body 11*b*, the second power feeding portion 32 inserted into the second through-hole 12*b* of the third plate body 11*c*, the third power feeding portion 33 inserted into the third through-hole 12*c* of the third plate body 11*c*, the first electrode layer 13 disposed between the first plate body 11*a* and the second plate body 11*b*, the second electrode layer 14 disposed between the second plate body 11*b* and the third plate body 11*c*, and the power feeding portion bonding layer 15 disposed between the first power feeding portion 31 and the second power feeding portion 32.

In the bonding and sintering procedure, the first plate body 11*a*, the second plate body 11*b*, and the third plate body 11*c* are sintered at a temperature of 1400° C. to 1900° C., in a non-oxidative atmosphere, preferably in an inert atmosphere, for a predetermined time while being pressurized in the thickness direction at 1 MPa to 50 MPa. With such a hot pressing procedure, the applied insulating layer paste 16*d*A becomes the first insulating bonding layer 16*d* to integrally bond the first plate body 11*a* and the second plate body 11*b*, the conductive layer paste 13A is sintered to form the first electrode layer 13, the insulating layer paste 16*e*A is sintered to form the second insulating bonding layer 16*e*, the conductive layer paste 14A is sintered to form the second electrode layer 14, and the conductive layer paste 15A is sintered to form the power feeding portion bonding layer 15, and the layers are integrally bonded by sintering. The first power feeding portion 31 is integrally bonded to the first electrode layer 13, the power feeding portion bonding layer 15, and the second plate body 11*b*. The second power feeding portion 32 is integrally bonded to the power feeding portion bonding layer 15 and the third plate body 11*c*. The third power feeding portion 33 is integrally bonded to the second electrode layer 14 and the third plate body 11*c*. It is preferable that the power feeding portion 30 and the plate body 11 are densely bonded at the boundary therebetween without a gap or almost without a gap.

In the present embodiment, a case where the first plate body 11*a*, the second plate body 11*b*, and the third plate body 11*c* are stacked in the thickness direction and simultaneously bonded has been described. The first plate body 11*a*, the second plate body 11*b*, and the third plate body 11*c* are stacked in the thickness direction and simultaneously bonded, so that the numbers of times the first plate body 11*a*, the second plate body 11*b*, and the third plate body 11*c* are heat-treated while being pressurized by hot pressing are the same as each other.

For example, in a case where the second plate body 11*b* and the third plate body 11*c* are bonded after the first plate body 11*a* and the second plate body 11*b* are bonded, the first plate body 11*a* and the second plate body 11*b* undergo the bonding and sintering step twice, and the third plate body 11*c* undergoes the bonding and sintering step once. In this case, the first plate body 11*a*, the second plate body 11*b*, the first insulating bonding layer 16*d*, the first electrode layer 13, and the first power feeding portion 31 may be excessively heat-treated, and the particle diameter of the main component may increase. In addition, the particle diameters of the main components of the first plate body 11*a*, the second plate body 11*b*, and the third plate body 11*c* may be different from each other, which may deteriorate the durability of the base body 10. However, in a case where the thermal history applied to the plate body 11 is appropriately set so that the particle diameter of the main component of the member constituting each plate body 11 is the same as in a case where the bonding and sintering step is performed once, the bonding between the first plate body 11*a* and the second plate body 11*b* and the bonding between the second plate body 11*b* and the third plate body 11*c* may be performed in separate steps. By separately performing the bonding between the first plate body 11*a* and the second plate body 11*b* and the bonding between the second plate body 11*b* and the third plate body 11*c*, the dimensional accuracy of the thickness of the plate body 11 can be improved.

In a case where the bonding and sintering step is performed twice, in order to make the particle diameters of the main components of the first plate body 11*a*, the second plate body 11*b*, and the third plate body 11*c* substantially the same, it is preferable to use a material having little particle growth due to sintering, such as an aluminum oxide-silicon carbide ($Al_2O_3$—SiC) composite sintered body as the forming materials of the first plate body 11*a*, the second plate body 11*b*, and the third plate body 11*c*.

(Brazing Step)

The brazing step is a step of connecting the terminal member to the lower end surface of the power feeding portion with a brazing agent interposed therebetween. For example, as shown in FIG. 2 and the like, the brazing step is a step of connecting the terminal member 35 to the lower end surface 33*t* of the third power feeding portion 33 or the like. In addition, although the illustration in FIG. 2 and the description here are omitted, the terminal member 35 can also be connected to the lower end surface of the second power feeding portion, for example, the lower end surface 32*t* of the second power feeding portion 32, by the same procedure as the third power feeding portion 33 (see FIG. 1).

For example, in the brazing step, first, the recess 33*a* is formed on the lower end surface 33*t* of the third power feeding portion 33. Further, the bottom surface 33*b* of the recess 33*a* is coated with a brazing agent, and overlapped with the third power feeding portion 33 and heat-treated. As a result, the lower end surface 33*t* of the third power feeding portion 33 and the upper end portion of the third power feeding portion 33 are brazed. During the heat treatment, the brazing agent melts and spreads from a position at which the brazing agent is applied, but the brazing agent remains inside the recess 33*a* of the lower end surface 33*t* of the third power feeding portion 33. By passing through this step, the brazed portion 5 is formed between the third power feeding portion 33 (and the second power feeding portion 32) and the terminal member 35. In a case where a recess is formed, as shown in FIG. 2, a recess may be provided on the lower surface of the power feeding portion, or as shown in FIG. 3, a recess may be formed on the lower surface of the plate body. In the latter case, the flat lower surface of the power feeding portion is exposed in the recess. As shown in FIG. 4, formation of a recess may be omitted.

The electrostatic chuck member 2 is manufactured through the above-described steps. In addition, the manufactured electrostatic chuck member 2 is mounted on the base member 3 provided with the terminal insulator 23. As a result, the electrostatic chuck device 1 is manufactured.

EXAMPLES (Production of Sample)

An electrostatic chuck member of each sample of Examples 1 to 5 and Comparative Examples 1 to 3 was produced through the steps described in the above manufacturing method, except for other steps described below. For example, Examples 1 to 3 are samples formed by the method as shown in FIG. 5. Examples 1 to 5 had a power feeding portion bonding layer and Comparative Examples 1 to 3 did not have a power feeding portion bonding layer. The sample was produced such that the diameter of the base body to be produced was 300 mm, the thickness of the first plate body was 0.4 mm, the thickness of the second plate body was 5 mm, and the thickness of the third plate body was 5 mm. The widths of the first insulating bonding layer 16*d* and the second insulating bonding layer 16*e* were set to 1 mm.

In the above-described plate body sintering step, the first plate body, the second plate body, and the third plate body were produced by forming and sintering a mixed powder of 90% by volume of aluminum oxide powder and 10% by volume of silicon carbide powder. In addition, in the power feeding portion sintering step, the conductive sintered bodies serving as the first power feeding portion, the second power feeding portion, and the third power feeding portion were produced by forming and sintering a mixed powder of 65% by volume of aluminum oxide powder and 35% by volume of molybdenum carbide powder.

In the machining step, the outer diameters of the first power feeding portion, the second power feeding portion, and the third power feeding portion were set to 4 mm, and the lengths thereof were set to 5 mm.

In the printing step, a thickness of the applied paste was set such that a thickness after drying was 80 μm for both the conductive layer paste (electrode layer paste and power feeding portion bonding layer paste) and the insulating layer paste. Two types of conductive layer pastes ([A] and [B]) and one type of insulating layer paste ([C]) were prepared and used. The pastes were applied to be arranged as shown in FIG. 1, FIG. 5, and Table 1.

In the bonding and sintering step, after the conductive layer paste ([A] or [B]) and the insulating layer paste ([C]) were applied, the first power feeding portion, the second power feeding portion, and the third power feeding portion were inserted into the respective through-holes, and the first plate body, the second plate body, and the third plate body were stacked to form a stacked body. Then, in an argon atmosphere, the stacked body was sintered and integrally bonded while being heated at a heat treatment temperature of 1700° C. and a pressure of 10 MPa.

In addition, a terminal member was provided on the lower surface of the second power feeding portion and the third power feeding portion.

An outer diameter of the terminal member was set to 6 mm. A recess having a diameter of 6.5 mm and a depth of 0.5 mm was provided on the lower surface of the second and third power feeding portions and in the periphery thereof, and the power feeding portions and the terminal member were brazed in the recess.

In addition, detailed configurations of each sample are shown in Table 1 below. Parameters of each sample in Table 1 will be described.

(The Number of Times of Hot Pressing)

Table 1 shows the number of times of hot pressing of Examples 1 to 5 and Comparative Examples 1 to 3. In Table 1, the phrase "The number of times of hot pressing" represents the number of times hot pressing was performed in the bonding and sintering step. In a case where the number of times of hot pressing was one, the first plate body, the second plate body into which the first power feeding portion was inserted, and the third plate body into which the second power feeding portion and the third power feeding portion were inserted were stacked in a state in which the conductive layer paste and the insulating layer paste were applied, and were pressurized in the thickness direction. In a case where the number of times of hot pressing was two, the first plate body and the second plate body into which the first power feeding portion was inserted were bonded by the first hot pressing, and then the third plate body into which the second power feeding portion and the third power feeding portion were inserted was bonded by the second hot pressing.

(Presence or Absence of Power Feeding Portion Bonding Layer)

Table 1 shows presence or absence of a power feeding portion bonding layer in Examples 1 to 5 and Comparative Examples 1 to 3.

In Table 1, the term "Power feeding portion bonding layer" indicates the presence or absence of the power feeding portion bonding layer. In a case where the power feeding portion bonding layer was "Present", the power feeding portion bonding layer was provided between the first power feeding portion and the second power feeding portion to be bonded to each other, and the second power feeding portion, the first power feeding portion, and the first electrode layer were electrically connected. In Comparative Example 1, in which the power feeding portion bonding layer was "Absent", one power feeding portion (sintered) in which the first power feeding portion and the second power feeding portion were formed in succession and communicated with each other was inserted into the second plate body and the third plate body, and the second plate body and the third plate body were bonded and sintered. In Comparative Example 2, after a sample was formed in the same manner as in Example 1, except that the second power feeding portion and the power feeding portion bonding layer were not provided, a recess reaching from the lower surface of the base body to the first power feeding portion was provided after the bonding and sintering step. Therefore, in Comparative Example 2, a location where the power feeding portion bonding layer was located was ground, and an inner side of the concave portion was formed. In Comparative Example 3, the power feeding portion bonding layer was not provided between the first power feeding portion and the second power feeding portion, and the first power feeding portion and the second power feeding portion were directly bonded without the power feeding portion bonding layer.

(Pre-Bonding Gap)

Table 1 shows a pre-bonding gap of Examples 1 to 5 and Comparative Examples 1 to 3.

A sample in which the gap between the first through-hole 12*a* and the first power feeding portion 31, the gap between the second through-hole 12*b* and the second power feeding portion 32, and the gap (pre-bonding gap) between the third through-hole 12*c* and the third power feeding portion were changed in the machining step was produced. Table 1 shows the pre-bonding gap of each sample. In Examples 1, 3, and 4 and Comparative Examples 2 and 3 in Table 1, for a difference between the outer diameter of the through-hole and the outer diameter of the power feeding portion, the through-hole was set to be larger than the power feeding portion by 0.05 mm. In Examples 2 and 5 and Comparative Example 1, the through-hole was set to be larger than the power feeding portion by 0.1 mm.

(Paste Composition)

Table 1 shows the type (paste composition) of a conductive layer paste (the same paste was used for an electrode layer paste and a power feeding portion bonding layer paste) used in Examples 1 to 5 and Comparative Examples 1 to 3. For Examples and Comparative Examples, two types of conductive layer pastes ([A] and [B]) and one type of insulating layer paste ([C]) were prepared and used in the screen printing step.

In the screen printing step, in a case where the paste composition shown in Table 1 was indicated as [A], as the conductive layer paste ([A]), a paste (conductive layer paste) obtained by dispersing aluminum oxide having an average particle diameter of 1 μm, a bulk density (tap density) of 1.4 $g/cm^3$, and an α-type crystal phase, aluminum oxide powder having a bulk density (tap density) of 0.2 $g/cm^3$ and a γ-type crystal phase, and molybdenum carbide powder having an average particle diameter of 1 μm in a solvent for screen printing was used. The α-type aluminum oxide powder and the γ-type aluminum oxide powder were mixed with each other such that the γ-type aluminum oxide powder was 3% by mass, and used as mixed aluminum oxide powder. The content of the mixed aluminum oxide powder in the conductive layer paste and the power feeding portion paste was set to 65% by volume, and the content of the molybdenum carbide powder was set to 35% by volume.

In the screen printing step, in a case where the paste composition shown in Table 1 was indicated as [B], as the conductive layer paste ([B]), a paste (conductive layer paste) obtained by dispersing aluminum oxide having an average particle diameter of 0.1 μm, a bulk density (tap density) of 1.0 $g/cm^3$, and an α-type crystal phase and molybdenum carbide powder having an average particle diameter of 1 μm in a solvent for screen printing was used. The content of the aluminum oxide powder in the conductive layer paste was set to 65% by volume, and the content of the molybdenum carbide powder was set to 35% by volume.

In addition, the insulating layer paste ([C]) was used together with [A] and [B] in Table 1, and a paste (insulating layer paste) obtained by dispersing aluminum oxide powder having an average particle diameter of 0.1 μm, a bulk density (tap density) of 1.0 $g/cm^3$, and an α-type crystal phase in a solvent for screen printing was used as the insulating layer paste ([C]).

(Structure of Power Feeding Portion)

Table 1 shows a structure of a power feeding portion used in Examples 1 to 5 and Comparative Examples 1 to 3.

In "Structure of power feeding portion" in Table 1, a structure of the power feeding portion connected to the second electrode layer is described in an upper row of each sample, and a structure of the power feeding portion connected to the first electrode layer is described in a lower row. In the sample described as "Third power feeding portion" in the upper row, as in the above-described embodiment, the third power feeding portion that was integrally bonded to the third plate body was provided, and the terminal member was connected and brazed to the lower surface of the third power feeding portion. Similarly, in the sample described as "First and second power feeding portions" in the lower row, as in the above-described embodiment, the second plate body was provided with the first power feeding portion, the third plate body was provided with the second power feeding portion, which were connected by the power feeding portion bonding layer, and the terminal member was brazed on the lower surface of the second power feeding portion. In the sample described as "First power feeding portion" in the lower row, a recess reaching from the lower surface of the base body to the first power feeding portion was provided, and a terminal was connected and brazed to the lower surface of the first power feeding portion in the recess.

The sample described as "*1" in the lower row of "Structure of power feeding portion" in Table 1 is a sample in which the first electrode layer and the like were subjected to hot pressing of bonding and sintering in a state in which one power feeding portion (corresponding to an integrated body of the first power feeding portion and the second power feeding portion) that communicates the through-holes provided in the second plate body and the third plate body was inserted into the through-holes provided in the second plate body and the third plate body. Therefore, in the sample of "*1", one power feeding portion penetrating the second plate body and the third plate body extended from the first electrode layer to the lower surface side of the base body, and the terminal was connected and brazed to the lower surface of the power feeding portion penetrating the second plate body and the third plate body.

(Post-Bonding Gap)

Table 1 shows post-bonding gaps measured for the samples of Examples 1 to 5 and Comparative Examples 1 to 3.

In Table 1, the term "Post-bonding gap" means a gap at a boundary between the outer peripheral surfaces of the first power feeding portion, the second power feeding portion, and the third power feeding portion and the base body after the bonding and sintering step. In a case where the outer peripheral surfaces of the first power feeding portion, the second power feeding portion, and the third power feeding portion, and the base body were densely bonded at the boundary therebetween, the gap was defined as "Absent". Whether the power feeding portion and the plate body were densely bonded at the boundary therebetween was determined by using an ultrasonic flaw detector. It was determined whether or not the region in which the reflected waves caused by the gap between the power feeding portion and the plate body were confirmed in a range of 1 mm from the outer periphery of the power feeding portion was 50% or less of the entire circumference, and in a case where the region in which the reflected waves could be confirmed in a range of 1 mm from the outer periphery of the power feeding portion was 20% or less, it was determined that the power feeding portion and the plate body were densely bonded at the boundary therebetween, and the gap was defined as "Absent". The measurement was performed under measurement conditions of the ultrasonic flaw detector with an oscillation (ultrasound) frequency set to 50 MHz, a focal length set to 40 mm, and a focus aligned with the lower surface of the power feeding portion in water.

(Electrical Resistance Between Power Feeding Portion and Electrode Layer)

Table 1 shows electrical resistances measured for the samples of Examples 1 to 5 and Comparative Examples 1 to 3.

For "Electrical resistance between power feeding portion and electrode layer" shown in Table 1, using a sample before the terminal member was attached by brazing, the electrode layer was exposed by providing a through-hole reaching from the upper surface of the base body to the electrode layer, and the electrical resistance between the electrode layer and the lower surface of the power feeding portion was measured. In a case of exposing the electrode layer, the electrode layer was exposed at a position that does not overlap with the position of the power feeding portion and that is separated from the power feeding portion by 10 mm.

In a case where the electrical resistance between the power feeding portion and the electrode layer is 10Ω or higher and lower than 10 MΩ, the electrode layer can be used as an electrode for electrostatic adsorption, but in a case of being used as an RF electrode or a heater electrode, the heat generation due to an electric current may increase. In a case where the electrical resistance between the power feeding portion and the electrode layer is 10 MΩ or higher, even when the electrode layer is used as an electrode for electrostatic adsorption, adsorption responsiveness deteriorates, so that there is a high possibility that it cannot be used.

In a case where the electrical resistance between the power feeding portion and the electrode layer is 10Ω or lower, more preferably 1Ω or lower, the electrode layer can be suitably used as any of an electrode for electrostatic adsorption, an RF electrode, or a heater electrode. In a case where the electrical resistance between the power feeding portion and the electrode layer is 0.5Ω or lower, in the electrode layer, the power feeding portion, and the terminal member, the electrical resistance of the bonding portion between the respective members can be determined to be equal to or lower than the electrical resistance of each member itself. Therefore, an effect of eliminating the need to consider the heat generation and the electric current loss due to the bonding portion is obtained.

(Withstand Voltage)

Table 1 shows withstand voltages measured for the samples of Examples 1 to 5 and Comparative Examples 1 to 3.

In the withstand voltage test, a conductive paste was applied to the upper part and the side surface of the base body, and a direct current voltage was applied between all the terminal members connected to the lower surface of the base body and the conductive paste to evaluate the withstand voltage (breakdown voltage). The voltage to be applied was increased from 8 kV/mm in increments of 1 kV/mm while being held for 1 minute at each voltage, and in a case where a current value exceeded 100 $nA/cm^2$, the measurement was terminated and the immediately preceding voltage was obtained to obtain a withstand voltage value.

(Temperature Uniformity)

The term "Temperature uniformity" shown in Table 1 represents temperature uniformity on the placement surface of the electrostatic chuck member of each sample of Examples 1 to 5 and Comparative Examples 1 to 3. For the measurement of the temperature uniformity, the same samples as the samples of Examples 1 to 5 and Comparative Examples 1 to 3 were produced and used. The terminal member and the base member were attached to the sample to be measured, and the temperature uniformity was measured as an electrostatic chuck device.

The temperature uniformity was evaluated by disposing each sample in a vacuum chamber equipped with an infrared heater. Four thermocouples for temperature measurement were attached to the placement surface of each sample. The attachment position of the thermocouple was located at the center directly above the third power feeding portion, a position separated by 30 mm from the center directly above the third power feeding portion (separated by 30 mm or more from the center directly above the first power feeding portion), the center directly above the first power feeding portion, and a position separated by 30 mm from the center directly above the first power feeding portion (separated by 30 mm or more from the center directly above the third power feeding portion). The position separated by 30 mm was also separated by 30 mm or more from the outer peripheral portion of the base body. As a procedure for the measurement, the inside of the vacuum chamber was evacuated to 0.1 Pa or less by a vacuum pump, the heating amount was set to 50 kW/m² using an infrared heater, and a refrigerant was caused to flow through the base member of the electrostatic chuck device. Then, the electrostatic chuck member of each sample was heated for a predetermined time such that the temperature of the upper surface of the base body is 70° C., and temperature differences in two thermocouples (a portion immediately above the power feeding portion and a portion separated by 30 mm from the portion) were measured. In the table, in a sample in which both the temperature difference in the first power feeding portion and the temperature difference in the third power feeding portion were lower than 1° C., the temperature uniformity was good, and the evaluation was "○ (acceptable)". A sample in which the temperature difference was 1° C. or more in either power feeding portion was poor in temperature uniformity, and the evaluation was "x (impossible)". A sample that was not evaluated was indicated as "– (not evaluated)".

TABLE 1

| | The number of times of hot pressing | Power feeding portion bonding layer | Pre-bonding gap (mm) | Paste composition | Structure of power feeding portion | Post-bonding gap | Resistance between power feeding portion and electrode layer | Withstand voltage (kV/mm) | Temperature uniformity |
|---|---|---|---|---|---|---|---|---|---|
| Example 1 | 1 | Present | 0.05 | [A] | Third power feeding portion | Absent | <0.5 | — | ○ |
| | | | | | First and second power feeding portions | Absent | <0.5 | ≥15 | |
| Example 2 | 1 | Present | 0.1 | [A] | Third power feeding portion | Present | 3600 | — | — |
| | | | | | First and second power feeding portions | Present | 4300 | ≥15 | |
| Example 3 | 1 | Present | 0.05 | [B] | Third power feeding portion | Absent | <0.5 | — | — |
| | | | | | First and second power feeding portions | Absent | <0.5 | 9 | |
| Example 4 | 2 | Present | 0.05 | [A] | Third power feeding portion | Absent | <0.5 | — | — |
| | | | | | First and second power feeding portions | Absent | <0.5 | ≥15 | |
| Example 5 | 2 | Present | 0.1 | [B] | Third power feeding portion | Present | 4500 | — | — |
| | | | | | First and second power feeding portions | Present | 9800 | ≥15 | |
| Comparative Example 1 | 1 | Absent | 0.1 | [B] | Third power feeding portion | Present | 3600 | — | |
| | | | | | *1 | Present | <0.5 | <8 | |
| Comparative Example 2 | 1 | Absent | 0.05 | [A] | Third power feeding portion | Absent | <0.5 | — | x |
| | | | | | First power feeding portion | Absent | <0.5 | ≥15 | |
| Comparative Example 3 | 2 | Absent | 0.05 | [A] | Third power feeding portion | Absent | <0.5 | — | — (not evaluated) |
| | | | | | First and second power feeding portions | Present | >1 × $10^7$ | ≥15 | |

Comparison Between Example 1 and Comparative Example 1

In Table 1, in the sample of Comparative Example 1, the hot pressing was performed in a state in which the power feeding portion was inserted into the through-holes provided in the second plate body and the third plate body. Therefore, in the bonding and sintering step, it was considered that as a result of the shrinkage on the power feeding portion in the vertical direction being smaller than a location where the power feeding portion bonding layer or the insulating bonding layer was applied, a load was applied to the first plate body directly above the power feeding portion, and the withstand voltage of the first plate body decreased on the power feeding portion.

On the other hand, in the sample of Example 1, in the bonding and sintering step, it was considered that the shrinkage of the power feeding portion and the shrinkage of the location where the power feeding portion bonding layer or the insulating bonding layer was applied in the vertical direction were the same, so that an excessive load was not applied to the first plate body directly above the power feeding portion, and thus good withstand voltage characteristics were obtained.

In the sample of Example 1, the resistance value between the power feeding portion and the electrode layer was smaller than that in the sample of Example 2. In the sample of Example 1, the gap between the power feeding portion and the through-hole provided in the plate body was smaller than that in the sample of Example 2, and no gap after the bonding and sintering was confirmed in the sample of Example 1. It was considered that, by eliminating the gap between the plate body and the power feeding portion, an appropriate stress could be applied to the power feeding portion bonding layer and the electrode layer on the power feeding portion, and the resistance value was reduced. On the other hand, it was considered that in a case where the gap was present, the stress was dispersed and reduced, so that the resistance value was increased.

Comparison Between Example 1 and Example 3

In the sample of Example 1, the withstand voltage value was higher than that in the sample of Example 3. In the sample of Example 1, the formed body density of the conductive layer after drying was made close to the formed body density of the insulating layer after drying by using a mixed powder of particles having a particle diameter close to a particle diameter of conductive particles and a powder having a low bulk density as insulating particles used in the conductive layer paste.

Therefore, it was considered that the conductive layer and the insulating layer had substantially the same thickness after the bonding and sintering, and the stress applied to the conductive layer and the insulating layer was appropriate, and good withstand voltage characteristics were obtained. On the other hand, in the sample of Example 3, the particle diameters of the conductive particles and the insulating particles used in the conductive layer paste are significantly different from each other. The larger the particle size distribution, the higher the space filling rate. Therefore, the formed body density of the conductive layer after the screen printing and drying was higher than that of the insulating layer. The higher the formed body density, the smaller the shrinkage during sintering, so that the thickness of the conductive layer after the bonding and sintering was thicker. Therefore, it was considered that an excessive load was applied to the first plate body, the stress applied to the insulating layer was reduced, and the withstand voltage characteristics were lower than that in Example 1.

For confirmation, for the samples of Example 1 and Example 3, samples in which cross sections of the power feeding portion bonding layer and the insulating bonding layer around the power feeding portion bonding layer were subjected to mirror finishing were produced, and the porosity was confirmed by performing SEM observation. In Example 1, the density of the insulating bonding layer obtained from the porosity was 98.9%, and the density of the power feeding portion bonding layer was 97.9%. On the other hand, in Example 3, the density of the insulating bonding layer was 98.2%, and the density of the power feeding portion bonding layer was 98.6%. This also suggests that in Example 3, the stress was concentrated on the power feeding portion.

Comparison Between Example 1 and Comparative Example 2

Comparative Example 2 was produced in the same manner as in Example 1, except that the sample was produced without being provided with the second power feeding portion and the power feeding portion bonding layer, and a recess reaching the first power feeding portion was provided in the base body to provide a portion for connecting the terminal. In this case, since the recess was provided, a problem occurred in that the heat transfer near the recess deteriorated and the temperature uniformity deteriorated.

Comparison of Examples 4 and 5 with Comparative Example 3

In the samples of Example 4, Example 5, and Comparative Example 3, the hot pressing was performed twice in the bonding and sintering step. The sample of Example 4 obtained the same results as Example 1, and the sample of Example 5 obtained results with the same tendency as the sample of Example 2.

The sample of Comparative Example 3 was produced under the same conditions as in the sample of Example 4, except that the power feeding portion bonding layer was not provided. However, the sample of Comparative Example 3 had a high resistance value between the power feeding portion and the electrode layer, and could not be used as the electrostatic chuck. In the sample of Comparative Example 3, it was considered that the stress applied between the second power feeding portion and the first electrode layer was reduced because there was a gap at the boundary between the second power feeding portion and the third plate body after the bonding.

Comparison Between Example 1 and Example 2

Figure 6:
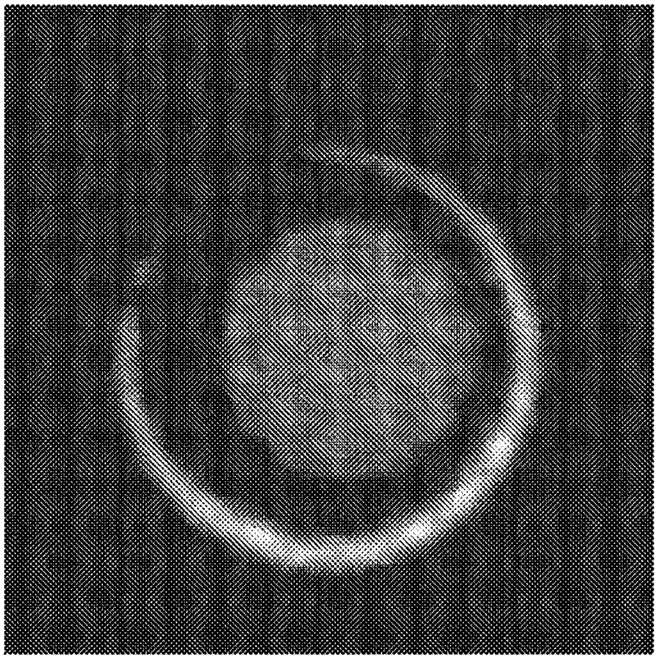
FIG. 6 is an image captured in an ultrasonic flaw detection test around a power feeding portion of a sample according to Example 1 in which a terminal member is brazed.
Figure 7:
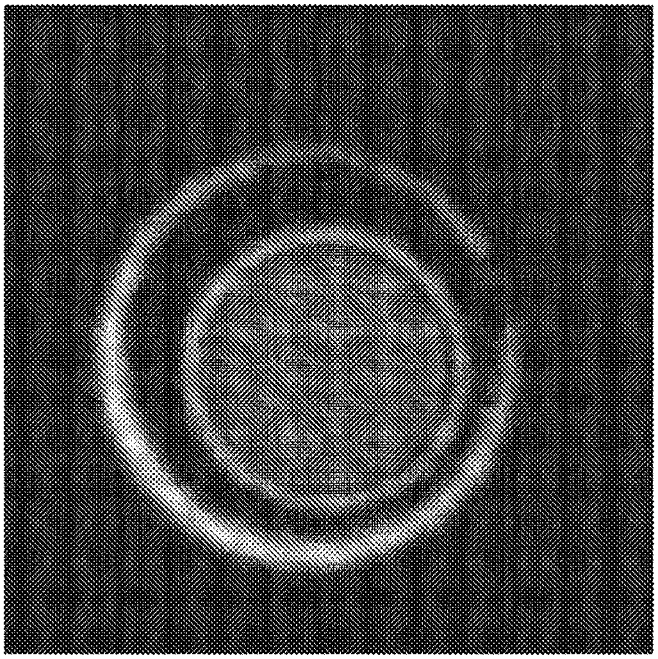
FIG. 7 is an image captured in an ultrasonic flaw detection test around a power feeding portion of a sample according to Example 2 in which a terminal member is brazed.

Next, for the samples of Example 1 and Example 2, a terminal member having a diameter of 6 mm was attached to the second power feeding portion by brazing, and a resistance value was measured by the same method as the resistance between the power feeding portion and the electrode layer. A resistance value between the terminal member and the electrode layer was 0.5Ω or lower in Example 1 and 10 MΩ in Example 2. In the sample of Example 2, it was considered that since there was a gap at the boundary between the power feeding portion and the base body, the bonding surface with the power feeding portion deteriorated due to the entrance of the brazing agent into the gap during the brazing or the like, and thus the resistance value was increased. FIG. 6 is a captured image in an ultrasonic flaw detection test around a power feeding portion of a sample obtained by brazing a terminal member to the sample of Example 1. FIG. 7 is a captured image in an ultrasonic flaw detection test around a power feeding portion of a sample obtained by brazing a terminal member to the sample of Example 2. In the captured images of FIGS. 6 and 7, a central gray circular region is the power feeding portion. In the captured image of Example 2 shown in FIG. 7, a gap appearing as a white arc streak is imaged over the entire circumference around the power feeding portion. On the other hand, in the sample of Example 1 shown in FIG. 6, it can be seen that such a gap does not appear.

Hereinabove, various embodiments of the present invention has been described. However, the configurations of the embodiments, a combination thereof, and the like are exemplary, and additions, omissions, replacements and other changes can be made for the configurations within a range not departing from the scope of the present invention. Further, the present invention is not limited to the embodiments.

For example, in the above-described embodiment, a case where the first insulating bonding layer is provided between the first plate body and the second plate body, and the second insulating bonding layer is provided between the second plate body and the third plate body has been described. However, one or both of the first insulating bonding layer and the second insulating bonding layer can be omitted. In addition, the present invention can be used even in a case where the terminal member is attached to the power feeding portion by another method such as a conductive adhesive, without being attached by brazing.

INDUSTRIAL APPLICABILITY

The present invention can provide a highly reliable electrostatic chuck member, an electrostatic chuck device, and a method for manufacturing an electrostatic chuck member.

The invention claimed is:

1. An electrostatic chuck member having a placement surface on which a sample is placed and a lower surface located on an opposite side of the placement surface, the electrostatic chuck member comprising:
- a first plate body, a second plate body, and a third plate body that are stacked in this order in a thickness direction and bonded to each other;
- a first electrode layer located between the first plate body and the second plate body;
- a power feeding portion bonding layer located between the second plate body and the third plate body;
- a first power feeding portion embedded in the second plate body and having a columnar shape; and
- a second power feeding portion embedded in the third plate body and having a columnar shape,
- wherein the first power feeding portion connects the first electrode layer and the power feeding portion bonding layer,
- the second power feeding portion extends from the power feeding portion bonding layer to a lower surface side,
- the first electrode layer and the second power feeding portion are electrically connected with the first power feeding portion and the power feeding portion bonding layer interposed therebetween, and
- wherein each of the first electrode layer, the power feeding portion bonding layer, the first power feeding portion, and the second power feeding portion is a composite sintered body of an insulating material and a conductive material.

2. The electrostatic chuck member according to claim 1,
- wherein the second power feeding portion and the first power feeding portion are disposed to face each other with the power feeding portion bonding layer interposed therebetween.

3. The electrostatic chuck member according to claim 1, further comprising:
- a second electrode layer located between the second plate body and the third plate body; and
- a third power feeding portion embedded in the third plate body, extending from the second electrode layer to the lower surface side, and having a columnar shape.

4. The electrostatic chuck member according to claim 3, further comprising:
- at least one of a first insulating bonding layer disposed between the first plate body and the second plate body at a position different from a position of the first electrode layer and a second insulating bonding layer disposed between the second plate body and the third plate body at a position different from positions of the second electrode layer and the power feeding portion bonding layer,
- wherein the first insulating bonding layer and the second insulating bonding layer are made of different materials from the first plate body, the second plate body, and the third plate body.

5. The electrostatic chuck member according to claim 3,
- wherein an outer peripheral surface of the first power feeding portion and the second plate body are densely bonded at a boundary therebetween, and an outer peripheral surface of the second power feeding portion and the third plate body are densely bonded at a boundary therebetween.

6. An electrostatic chuck device comprising:
- the electrostatic chuck member according to claim 1; and
- a base member that supports the electrostatic chuck member from the opposite side of the placement surface.

7. A method for manufacturing an electrostatic chuck member, the method comprising:
- a plate body sintering step of obtaining a first plate body, a second plate body, and a third plate body by sintering;
- a power feeding portion sintering step of obtaining a first power feeding portion, a second power feeding portion, and a third power feeding portion by sintering; and
- a bonding and sintering step,
- wherein the bonding and sintering step comprises bonding and integrating the first plate body, the second plate body, the third plate body, a first electrode layer disposed between the first plate body and the second plate body, the first power feeding portion inserted into a first through-hole of the second plate body, the second power feeding portion inserted into a second through-hole of the third plate body, and a power feeding portion bonding layer disposed between the first power feeding portion and the second power feeding portion,
- wherein the power feeding portion bonding layer is a composite sintered body of an insulating material and a conductive material.

8. The method for manufacturing an electrostatic chuck member according to claim 7,
- wherein, in the bonding and sintering step, the third power feeding portion inserted into a third through-hole of the third plate body and a second electrode layer disposed between the second plate body and the third plate body are also integrated together.

9. The method for manufacturing an electrostatic chuck member according to claim 8, further comprising:

before the bonding and sintering step, inserting the first power feeding portion into the first through-hole of the second plate body, inserting the second power feeding portion into the second through-hole of the third plate body, and inserting the third power feeding portion into the third through-hole of the third plate body; and disposing the first electrode layer between the first plate body and the second plate body and disposing the second electrode layer and the power feeding portion bonding layer between the second plate body and the third plate body.

10. The method for manufacturing an electrostatic chuck member according to claim 7, further comprising:

before the bonding and sintering step, preparing a conductive layer paste for forming the first electrode layer, a conductive layer paste for forming the second electrode layer, and a conductive layer paste for forming the power feeding portion bonding layer;

applying the conductive layer paste for forming the first electrode layer onto at least one of the first plate body and the second plate body; and applying the conductive layer paste for forming the second electrode layer and the conductive layer paste for forming the power feeding portion bonding layer onto at least one of the second plate body and the third plate body.

11. The electrostatic chuck member according to claim 1, wherein the first plate body, the second plate body, and the third plate body are a plate body obtained by forming and sintering a mixed powder of aluminum oxide powder and silicon carbide powder, the first power feeding portion and the second power feeding portion are a columnar member obtained by forming and sintering a mixed powder of aluminum oxide powder and molybdenum carbide powder, and the power feeding portion bonding layer is a layer obtained by disposing and drying a power feeding portion bonding layer paste on one surface of either of the first power feeding portion embedded in the second plate body and the second power feeding portion embedded in the third plate body, and overlapping and hot pressing the first power feeding portion and the second power feeding portion such that the dried power feeding portion bonding layer paste is located inside.

* * * * *